Dec. 22, 1953 M. S. MERRILL ET AL 2,663,184

METHOD OF AND APPARATUS FOR BALANCING ROTATING BODIES

Filed Feb. 17, 1947 7 Sheets-Sheet 1

INVENTOR.
Marcellus S. Merrill
BY Lowell H. Erickson
P. H. Lamphere
ATTORNEY

INVENTOR.
Marcellus S. Merrill
BY Lowell H. Erickson
P. H. Lamphere
ATTORNEY

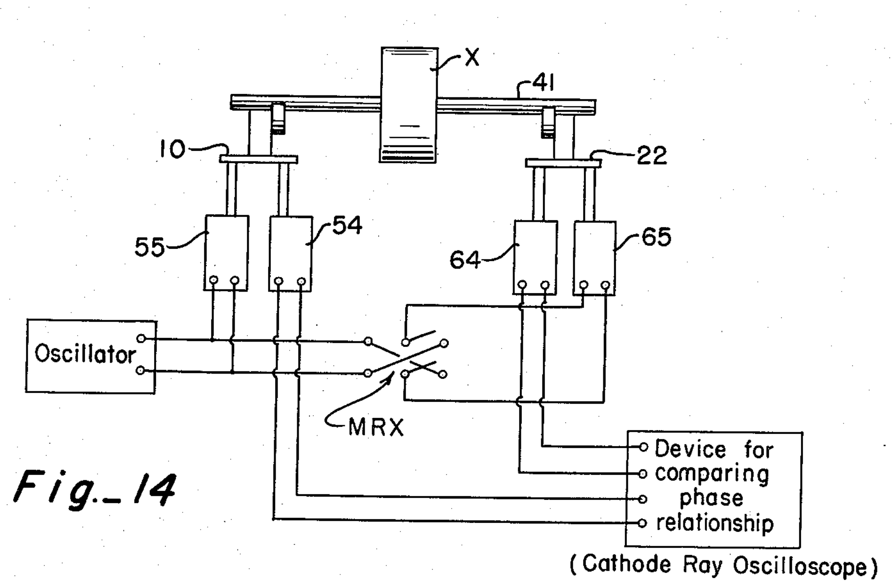
Fig._14
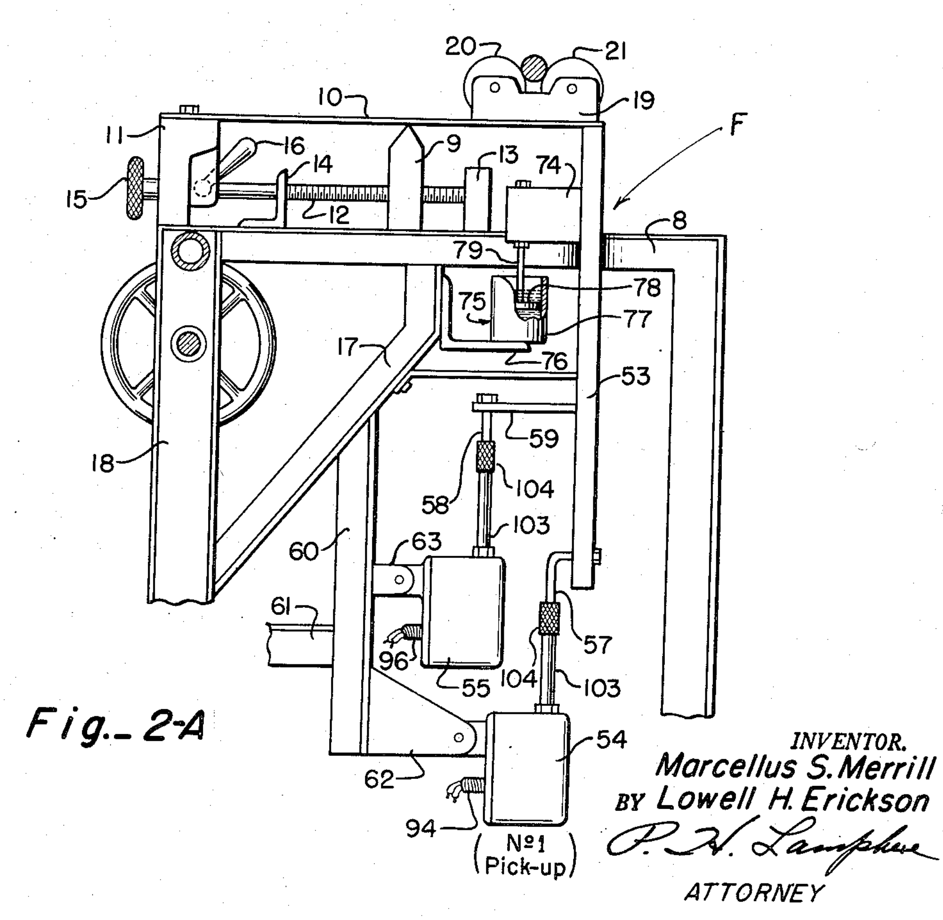
Fig._2-A
INVENTOR.
Marcellus S. Merrill
BY Lowell H. Erickson
P. H. Lamphere
ATTORNEY INVENTOR.
Marcellus S. Merrill
BY Lowell H. Erickson
P. H. Lamphere
ATTORNEY Dec. 22, 1953 M. S. MERRILL ET AL 2,663,184

METHOD OF AND APPARATUS FOR BALANCING ROTATING BODIES

Filed Feb. 17, 1947 7 Sheets-Sheet 5

INVENTOR.
Marcellus S. Merrill
BY Lowell H. Erickson
P. H. Lamphere
ATTORNEY

Dec. 22, 1953 M. S. MERRILL ET AL 2,663,184

METHOD OF AND APPARATUS FOR BALANCING ROTATING BODIES

Filed Feb. 17, 1947

7 Sheets-Sheet 6

INVENTOR.
Marcellus S. Merrill
BY Lowell H. Erickson
P. H. Lamphere
ATTORNEY

INVENTOR.
Marcellus S. Merrill
BY Lowell H. Erickson
P. H. Lamphere
ATTORNEY

Patented Dec. 22, 1953

2,663,184

UNITED STATES PATENT OFFICE 2,663,184

METHOD OF AND APPARATUS FOR BALANCING ROTATING BODIES

Marcellus S. Merrill and Lowell H. Erickson, Denver, Colo.; said Erickson assignor to said Merrill Application February 17, 1947, Serial No. 728,980

16 Claims. (Cl. 73—66)

This invention relates to the balancing of rotatable bodies and more particularly to an improved method and apparatus for determining both the static and dynamic unbalance of a rotating body.

One of the objects of the invention is to produce an improved electro-mechanical apparatus whereby various sizes and shapes of rotating bodies can be accurately balanced, both statically and dynamically, in a minimum of time.

Another object is to produce a balancing apparatus which is so designed that simple and quickly performed adjustments can be made to determine the unbalance of various kinds, shapes and masses of rotating bodies.

A further object is to produce an electro-mechanical balancing apparatus which will be capable of causing a vibratory cradle and a body desired to be balanced to have sustained oscillation at the resonant frequencies of the system whereby data therefrom can be ascertained for determining both the static and dynamic unbalance with the body rotating at its resonant speed.

Yet another object is to produce a balancing apparatus which will provide for the yieldable supporting of the body at spaced axial points, the oscillating of the body on the yieldable supports to ascertain the frequency of vibration at resonance, and the determining of both the static and dynamic unbalance when the body is rotating at resonant speeds.

A further object is to provide an improved balancing machine which will permit determination of the speed at which an unbalanced rotating body must be rotated to be at resonance so that the nature of the unbalance of the body can be determined by suitable instruments during rotations of the body at the said determined resonant speed.

A further object is to provide an improved electromechanical balancing machine which will permit, during the rotation of an unbalanced body, the separation of vibrations caused by static unbalance from the vibrations caused by dynamic unbalance.

A further object is to produce an improved vibratory cradle structure and associated oscillating means for a body to be balanced which will permit the body to be caused to have sustained oscillation at resonance on the cradle by simple adjustments.

Still a further object is to provide an improved method of determining the static and dynamic unbalance of a rotatable body at resonant speed.

A further object is to produce an improved electronic method of cradle balancing.

A further object is to provide means and method for setting up a resonant type balancing cradle for a rotatable body preparatory for accomplishing balancing operations.

A further object is to produce an improved method of balancing in which a resonant cradle is employed.

Other objects of the invention will become apparent from the following description taken in connection with the accompanying drawings in which:

Figures 2 and 2A are sectional views of the cradle and frame unit with some parts being broken away to show details of construction, said views being taken on the lines 2—2 and 2A—2A of Figure 1;

Figure 14 is a schematic view similar to Figure 13, but disclosing another method which can be employed to set up a resonant type cradle prior to performing balancing operations.

Figure 1:
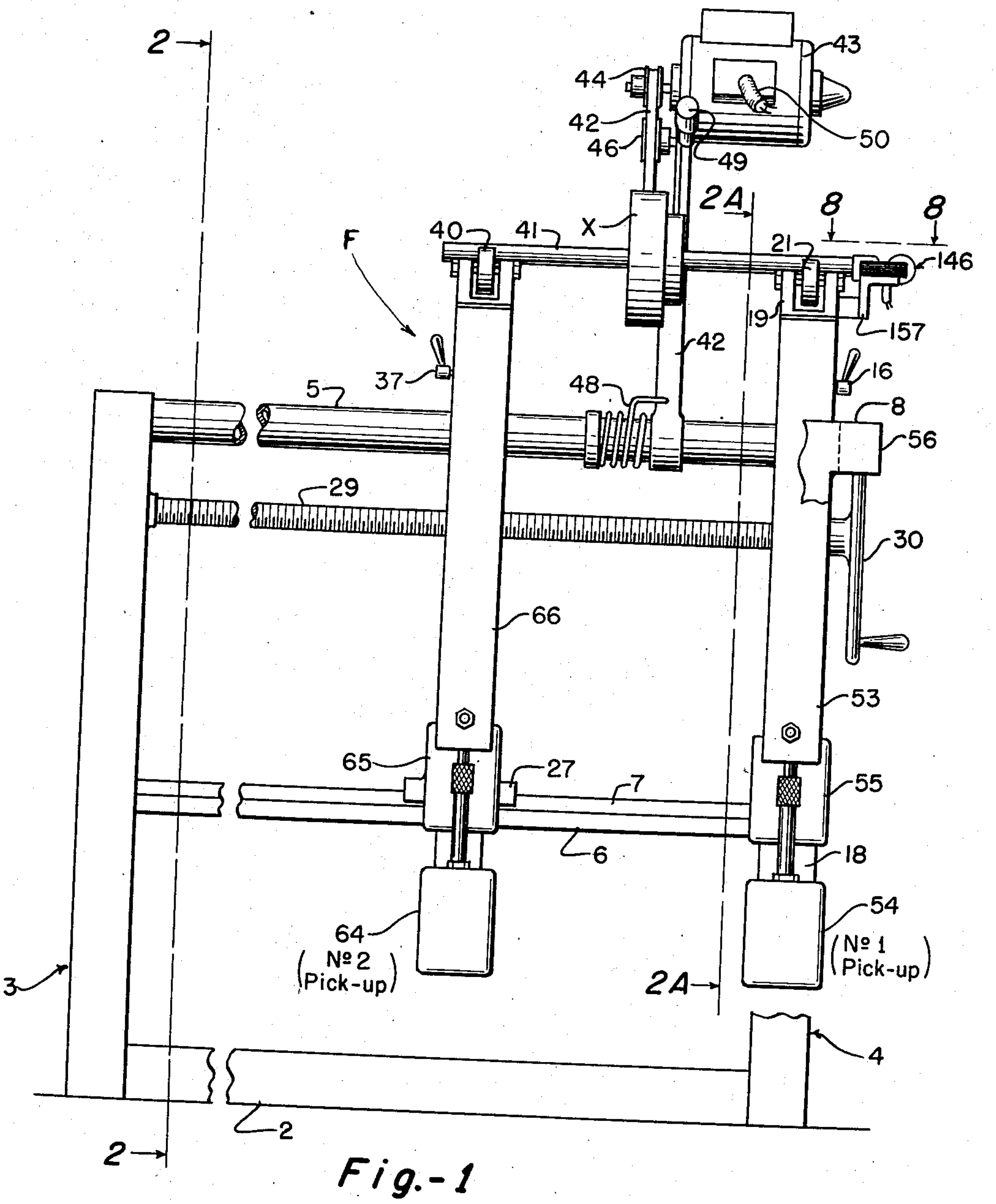
Figure 1 is a front view of a balancing cradle and frame unit of a balancing machine embodying our invention.

Referring to the drawings in detail, and first to Figures 1 to 4 inclusive, the improved balancing machine shown by way of example as embodying our invention and by means of which the improved method of balancing is accomplished, comprises essentially three units, namely, the balancing cradle unit F together with its frame, the cabinet E containing the electronic equipment, meters, switches and other parts of the hook-up, and the stroboscopic device B which is in the form of a stroboscopic lamp. The balancing cradle and its frame, as shown by way of example, consists of longitudinal base members 1 and 2 and end frame members 3 and 4 in the form of upright rectangular structures constructed from suitable metal or other framing suitably secured together. The end frame members are connected together at their back side by two members 5 and 6, the former being in the form of a tube positioned adjacent the top of the two frame members and the latter being a flat cross brace on which is mounted a guide plate 7.

The top cross piece 8 of the right hand end frame 4, as viewed from the front of the machine in Figure 1, has mounted thereon a movable fulcrum block 9 (see Figure 2A) for one of the yieldable supports of the cradle which is in the form of a leaf spring 10. This yieldable support will, other than being capable of vibration, be non-movable with respect to the frame structure. The intermediate part of the leaf spring rests upon the fulcrum block and the rear end of the spring is secured to a block 11 mounted at the back end of the end frame 4. The fulcrum block 9 is arranged to be moved to different intermediate positions along the spring 10 by means of a threaded rod 12 which extends through a threaded hole in the block. The forward end of the rod is journaled against axial movement in a support 13 secured to the top of the cross piece 8 and its rear end is journaled in the block 11. An additional support member 14 also may be provided forwardly of the block 11. The rod at its outer rear end beyond the block 11 is provided with a hand wheel 15 whereby it may be conveniently turned to shift the fulcrum block 9 along the top of the cross piece 8. A hand operated set screw 16 is provided for holding the rod in a fulcrum adjusted position. The arrangement for adjusting the fulcrum position permits the amplitude and critical frequency of the vibration of the forward free end of the leaf spring to be readily varied at will. The cross piece 8 is given additional support by means of a brace 17 which extends from the central part of the top cross piece 8 to the rear upright 18 of the end frame member 4. The forward free end of the leaf spring 10 carries a bearing frame 19 upon which is rotatably supported two wheels 20 and 21 rotatable in the same plane and having their axes spaced apart a distance so that a shaft or arbor can be supported and freely rotate on the wheels as bearings.

Figure 2:
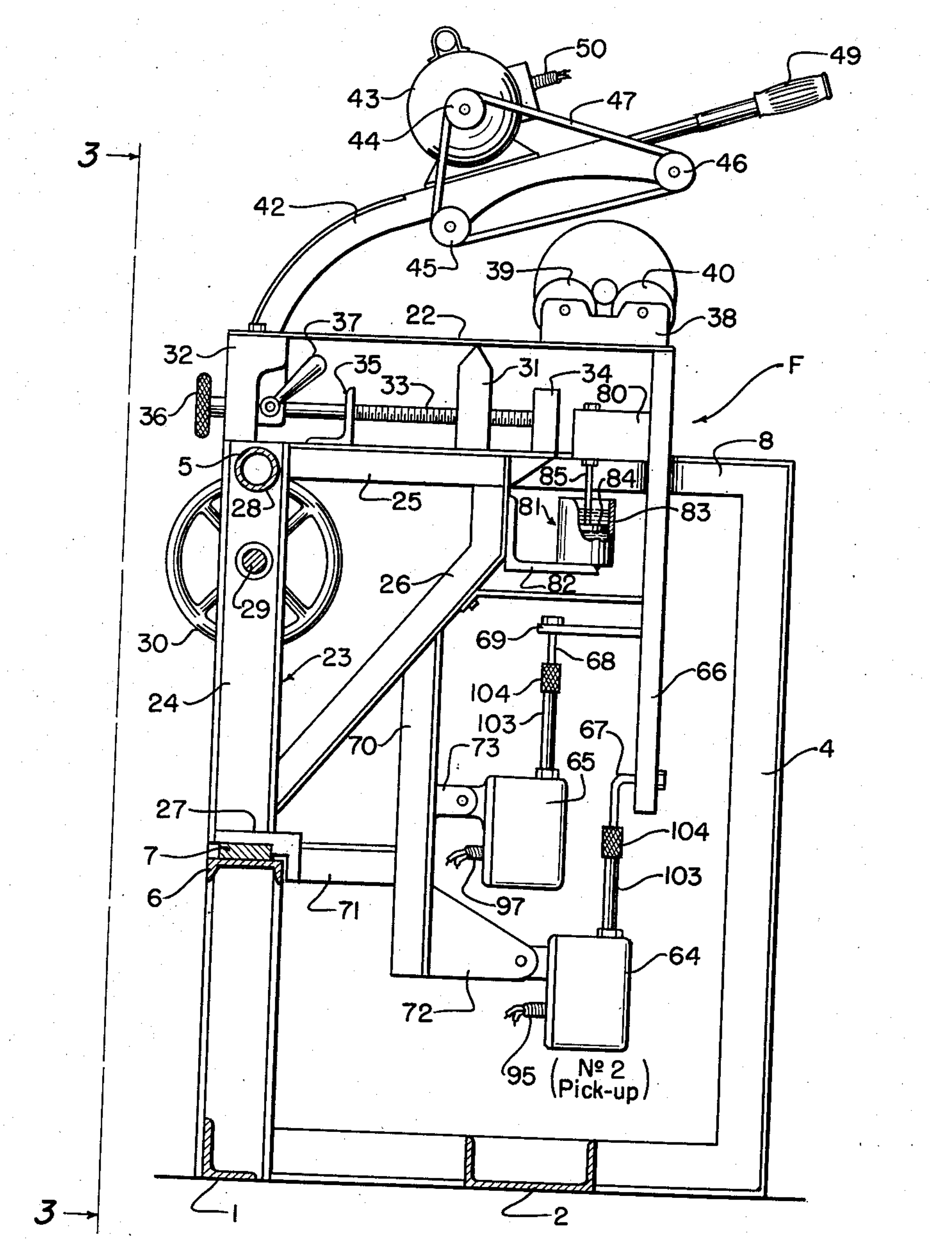

As best shown in Figure 2, the cradle also comprises a second parallel leaf spring 22 which is so mounted as to be movable with respect to the leaf spring 10 to thereby vary the distance between the springs. To accomplish this there is provided a triangular shaped bracket generally indicated by the numeral 23 and comprising an upright member 24, a horizontal member 25 and an angular brace member 26. The upright member is provided with a guide foot 27 at its lower end which rests upon the previously mentioned guide plate 7 carried by the back longitudinal connecting member 6. The upper end of the upright member 24 is provided with a bearing hole 28 which receives the previously mentioned tubular brace 5. With this arrangement it is seen that the triangular bracket can be moved either towards or away from the end frame member 4 as desired. The moving is arranged to be accomplished by means of a longitudinal screw 29 which is threaded through the upright member 24 of the triangular bracket. This screw has its ends journaled in the two end frame members 3 and 4 and on its outer end, which is arranged to extend through the frame member 4, there is provided a hand wheel 30 by which the screw can be turned. When the screw is turned in one direction by the hand wheel the bracket 24 will be moved towards the end frame 4 and when turned in the opposite direction will be moved away from said end frame.

The horizontal member 25 of the triangular shaped bracket has slidably mounted thereon the movable fulcrum block 31 which provides the fulcrum for the intermediate portion of the leaf spring 22 and whereby the amplitude and critical frequency of vibration of such spring can be varied at will. The rear end of this leaf spring is secured to a block 32 mounted on the rear of the movable bracket 23. The fulcrum block is movable in the same manner as the other mentioned fulcrum block 9 by a threaded rod 33 which has its forward end journaled in a member 34 carried by the bracket and at its rear end journaled in the block 32. There may also be provided an additional bearing support 35. A hand wheel 36 at the rear end of the threaded rod permits it to be readily turned so as to shift the fulcrum to any desired position. There is also provided a hand operated set screw 37 for clamping the rod in any adjusted position. The outer free end of the leaf spring 22 carries a bearing frame 38 upon which two bearing wheels 39 and 40 are rotatably mounted, whereby a shaft or arbor can be rotatably supported by these wheels on the outer end of the leaf spring.

Figures 3, 4:
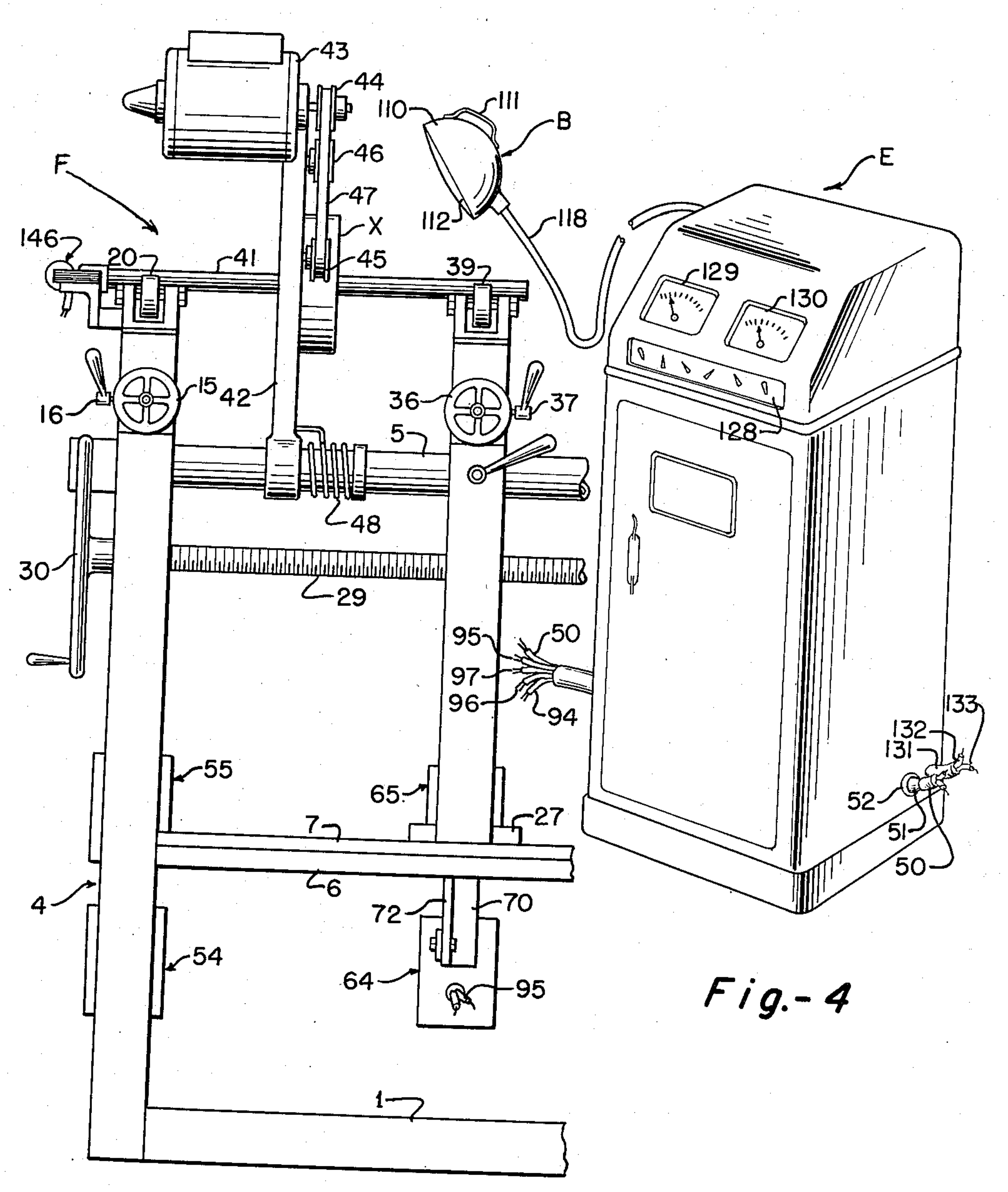
Figure 3 is a rear view of the cradle and frame unit as viewed on line 3—3 of Figure 2.
Figure 4 is a view of the cabinet unit and stroboscopic device unit.

With the cradle just described and comprising the two leaf springs 10 and 22, it is seen that any rotatable body to be balanced can be mounted on the free yieldable ends of the leaf springs and given a rotation and during such rotation the vibrations set up by the rotatable body can be transferred to the springs and result in their vibration. As shown in Figures 1, 2 and 3 of the drawings, any body X which is to be balanced can be suitably mounted on a shaft or arbor 41 and the ends thereof rotatably supported on the bearing wheels carried by the free ends of the leaf springs. The shaft or arbor shown is especially designed to receive the body X, but if this body X should already be provided with a shaft, no special shaft or arbor is necessary and its own shaft can have its ends rotatably supported on the bearing wheels.

In order to rotate the body X during the balancing operation, suitable means is provided which, as shown by way of example, comprises a belt driven by a suitable electric motor. A manually actuated arm 42 is pivoted at one end on the tubular connecting member 5 of the frame, already referred to, at a point between the end frame member 4 and the movable bracket 23. This arm is so curved as to extend forwardly in overlying relation to the body X which is to be mounted for rotation on the cradle. The arm has mounted thereon a motor 43 and the outer end of its rotor shaft carries a pulley 44. On the arm 42 is rotatably mounted two other spaced idler pulleys 45 and 46. These pulleys, together with the motor pulley, are so spaced as to form a triangle and trained over these pulleys is a belt 47. Pulleys 45 and 46 lie below the arm and are so spaced that the portion of the belt extending between the two pulleys can be brought into engagement with the body X to be balanced whenever the swinging arm 42 is lowered by manual operation. In order that the belt will become disengaged from the body X after it is brought up to a desired speed, a coil spring 48 is associated with the pivot end of the arm in the tube and exerts sufficient pressure so that whenever hand pressure is removed from the handle 49 at the free end of the arm, the motor and arm will be moved upward sufficiently to bring about the disengagement of the belt with the body. An electrical cable 50 brings power to the electric motor from the cabinet E and this motor will be capable of being started and stopped by a cabinet switch which will be later described. The cable 50 has a plug 51 which can be inserted in a socket 52 in the cabinet as seen in Figure 4.

Each of the cradle leaf springs 10 and 22 are arranged to have associated with their free outer ends an electrical pick-up assembly and an electrical driver assembly, the purpose of which will later become apparent. As shown in Figures 1, 2A and 3, the leaf spring 10, at its outer free end, has secured thereto a downwardly extending member 53 and connected thereto is the pick-up assembly 54 and the driver assembly 55. Since the downwardly extending member 53 is to extend to a point below the top cross piece 8 of the end frame 4, the cross piece 8 is formed to have a U-shaped portion 56 which the member 53 can pass unobstructed. The pick-up assembly 54 is connected by a rod 57 to the lower end of the member 53 and the driver assembly 55 is connected by a rod 58 to a lateral arm 59 rigidly attached to the member 53 at a point below the lower end. In order to provide a mounting for the pick-up and driver assemblies, the angular brace 17 of the end frame member 4 has secured thereto a support member 60 which is braced by a cross piece 61 extending to the rear upright 18 of the end frame member 4. The lower end of the support member 60 carries an ear 62 to which the pick-up assembly 54 is attached and above this ear is another ear 63 to which the driver assembly 55 is attached.

As is best seen in Figures 1, 2 and 3, the movable cradle leaf spring 22 also has associated therewith a pick-up assembly 64 and a driver assembly 65 which are attached to a downwardly extending member 66 carried by the outer free end of said leaf spring. The pick-up assembly 64 is attached by a rod 67 to the lower end of the downwardly extending member 66 and the driver assembly is connected by a rod 68 to an arm 69 secured to the member 66 above the lower end as is best seen in Figure 2. The mounting for the pick-up and driver assemblies comprises a support member 70 attached to the angular brace 26 of the movable bracket 23 with which is associated a brace 71 which is attached to the foot 27 of the movable triangular bracket. The pick-up assembly 64 is mounted on ear 72 extending from the lower end of the support member 70 and the driver assembly 65 is connected to an ear 73 carried by the support member 70 above the previously mentioned ear 72.

In order that the amplitude and phase shift of the vibrations of the outer ends of the two leaf springs of the cradle may be properly controlled, damping dash pots are provided. As is best shown in Figure 2A the downwardly extending member 53 of the leaf spring 10 has an arm 74 secured thereto just below its connection with the spring, and associated with this arm is a dash pot 75 carried on a shelf 76 attached to the angular brace 17. The dash pot comprises a cylinder 77 containing a suitable liquid and slidable therein is a piston 78 which has a rod 79 connected to the arm 74. A suitable clearance is provided between the piston and the cylinder wall so as to obtain the desired damping action. If it is desired to have the damping action variable, then an adjustable by-pass can be provided around the piston as is well known practice.

In a similar manner the downwardly extending member 66 suspended from the outer end of the leaf spring 22 has an arm 80 and associated with this arm is a dash pot 81 carried on a shelf 82 attached to the upper end of the angular brace 26 of the movable triangular bracket 23. The dash pot comprises a liquid containing cylinder 83, a piston 84 and a piston rod 85 for connecting the piston to the arm 80.

Figures 6, 7, 8:
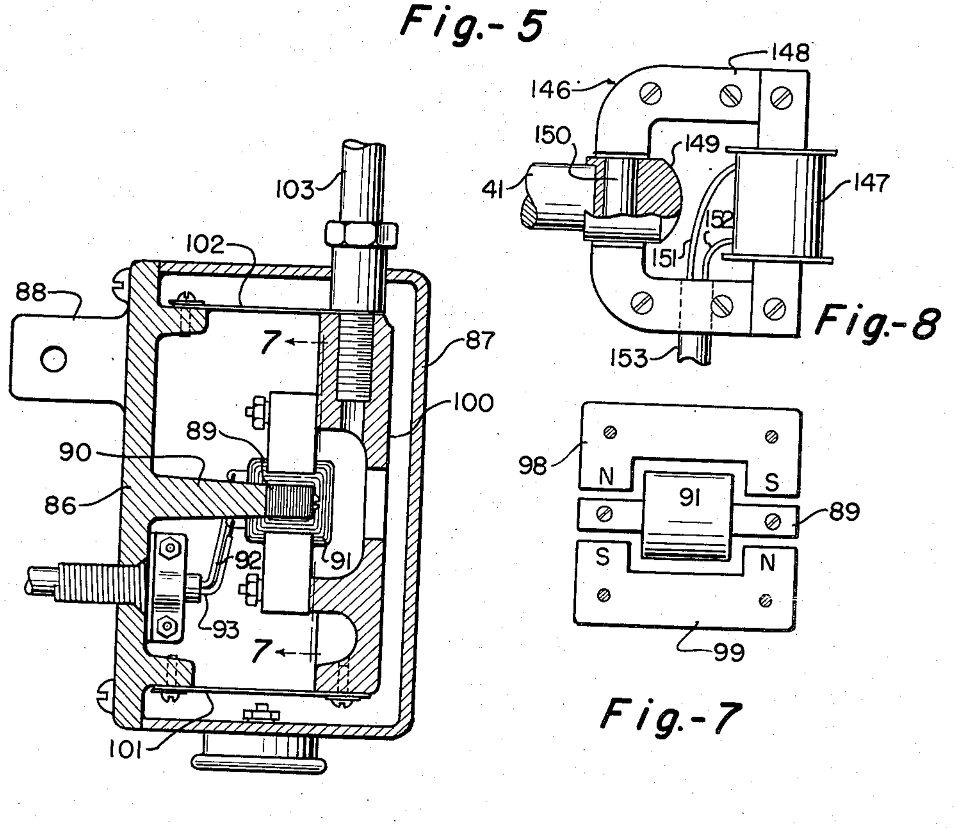
Figure 6 is a longitudinal section view showing details of the drivers and pick-ups.
Figure 7 is a cross sectional view showing additional details of the driver and pick-up units, said view being taken on the line 7—7 of Figure 6.
Figure 8 is a sectional view taken on the line 8—8 of Figure 1 showing the actual speed pick-up device.

Each of the pick-up and driver assemblies are of identical construction and, therefore, only one needs to be described in detail. The details of the assemblies are shown in Figures 6 and 7. As shown in Figure 6, the assembly comprises a base member 86 to which is attached a casing 87. The base member has an integral attaching ear 88 whereby the assembly can be mounted in a manner already referred to. Within the casing 87 is a magnetically permeable core 89 which is mounted on an extension 90 of the base member 86. Surrounding the central part of this core is an electrical coil 91 having its terminals connected to electrical conductors 92 and 93 which are enclosed by a suitable cable which leads to the cabinet E. Each pick-up and driver assembly will have a separate cable. In order that these electrical connecting cables may be properly identified for each assembly, the cable which leads to the pick-up 54 is indicated by the numeral 94, the cable to the pick-up 64 is indicated by the numeral 95, the cable connected to the driver 55 is indicated by the numeral 96 and the cable to the driver 65 is indicated by the numeral 97.

As is best seen in Figure 7, the coil and its core have associated therewith two permanent magnets 98 and 99 of general U-shaped form, one of the magnets being upon one side of the coil and the other magnet on the opposite side with their poles associated with the ends of the core. The magnets are so arranged that the north pole of each is opposite the south pole of the other as indicated in Figure 7. These permanent magnets are arranged to be mounted upon a support 100 by means of suitable bolts. This support 100 is yieldably mounted in the casing 87 by means of leaf springs 101 and 102 connected to opposite ends thereof and secured to the base member 86 by means of suitable ears as shown in Figure 6. The leaf springs normally maintain the permanent magnets so spaced from the core that there will be a uniform air gap between each pole and the core. The magnet support is provided with a rod 103 which extends out of the casing 87 and by means of this rod the support for the magnet will be connected to the previously mentioned attaching rods 57 and 58, 67 and 68, all previously referred to, depending on whether the assembly is to be used as a pick-up or a driver. The connection between the rod 103 and the rod to which it is attached is arranged to be adjustable, which adjustment is accomplished by the threaded knurled sleeve 104 (see Figures 2 and 2A).

When the assembly just described is employed as a pick-up, the vibration of a leaf spring of the cradle will cause a corresponding movement of the permanent magnets since these permanent magnets are connected to the leaf spring. This vibration of the leaf spring will thus change the air gaps between the poles of the magnets and the ends of the core which will produce a change in the magnetic flux and by means thereof induce a voltage into the windings of the coil and thus a small current will flow in the conductors of the coil which will alternate as the magnets are moved towards and from the core. The induced voltage created by the pick-up in the coil 91 will be in proportion to the velocity of vibration of the leaf spring of the cradle. Thus it is seen that by means of the pick-up spring, vibrations will be transformed into electrical impulses.

When the assembly is used as a driver, current will be caused to flow through the coil 91 by suitable electrical connections with a source of electrical energy. This flow of current will thus change the magnetic flux in the ends of the core and consequently forces will be created between the coil core and the magnets and thereby create a vibration and because of the connection of the magnets with the leaf springs this vibration will be transmitted to the ends of the leaf springs and cause such springs to vibrate. As will become later apparent, the drivers are employed only in setting up the cradle prior to performing a balancing operation and to cause the body which is to be balanced to have sustained oscillation at resonance. Only one of the pick-ups, as will also become later apparent, will be employed in setting up the sustained oscillation of the cradle preparatory to the balancing operation. Both pick-ups will be employed in performing a balancing operation, as it will be by means of them that the vibrations transmitted to the cradle by the rotation of the body to be balanced will be transferred into electrical impulses which will be in phase with the vibrations being caused by static and dynamic unbalancing factors.

Figure 11:
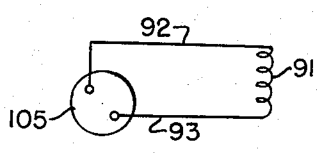
Figure 11 is a diagrammatic view showing the electrical connections for the driver and pick-up assemblies.

The wiring circuit for each of the driver and pick-up assemblies is shown in Figure 11. The conductors 92 and 93, which lead through a cable from the ends of the coil 91, are connected through the cable to a plug indicated at 105. The plugs 105, associated with the cables 96 and 97 coming from the two driver assemblies, will be connected into the two sockets 106 and 107 which are indicated on the wiring diagram of the electronic hookup contained in the cabinet E, said wiring diagram being shown in Figure 9. The connection to the sockets 106 and 107 will be later described in connection with the wiring diagram of Figure 9. The two pick-up assemblies which are connected to the plug 105 through cables 94 and 95 are arranged to be connected into the sockets 108 and 109 which are indicated on the wiring diagram of the electronic hookup in Figure 9. The connections to the electrical socket 108 and 109 receiving the plugs 105 of the pick-up assemblies will be later described in connection with this hookup.

Figure 12:
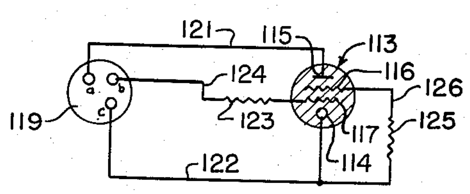
Figure 12 is a diagrammatic view showing the electrical connections for the Strobotron tube embodied in the stroboscopic device.

The stroboscopic device B, shown in Figure 4, comprises a casing 110 having a suitable handle 111 and a lens 112. The lamp housing is provided internally with a reflector (not shown) and adjacent this reflector is positioned a Strobotron tube 113 shown in the wiring diagram of Figure 12. This tube has a cold cathode 114, a plate 115 and two grids 116 and 117 and is arranged to be fired by electrical impulses picked up by the pick-up assemblies after said impulses have been modified by the electronic tube circuit shown in Figure 9 contained in the cabinet E. The Strobotron tube is connected through a cable 118 (Figure 4) to the electronic circuit in the cabinet E, this cable being provided at its connecting end with a three pronged connecting plug 119 which is arranged to be received by a socket 120 indicated in the wiring diagram of Figure 9. The prongs of the plug are indicated by the letters *a*, *b* and *c* and the receiving contacts of the socket which cooperate with these prongs are indicated by like letters. The connections to the receiving contacts will be described in connection with the electronic circuit illustrated by the wiring diagram of Figure 9. As shown in Figure 12, the prong *a* of the plug 119 is connected by a conductor 121 to the plate 115 of the Strobotron tube. A conductor 122 connects the cathode with the prong *c* of the plug. The grid 117 is connected through a resistance 123 to the prong *b* by a conductor 124 and the other grid 116 is connected through a resistance 125 and a conductor 126 to the cathode 114 of the Strobotron tube.

Referring now to Figure 4, the cabinet unit E contains the electronic equipment for the balancing machine. This cabinet is provided with a control panel 128 shown enlarged in Figure 5. The control panel is provided with six control buttons for controlling switches and a variable resistance of the electronic equipment within the cabinet, all of which is disclosed in the wiring diagram of Figure 9. The control buttons are indicated by the letters A, C, M, S, R and D. Above the control panel are two meters 129 and 130, the meter 129 being what may be termed a sensitivity or amplitude meter and is employed to indicate the amplitude of the vibrations which are picked up by the pick-up assemblies. The calibration on this meter is in arbitrary units from 0 to 10. The meter 130 is a frequency measuring meter and is calibrated in revolutions per minute. This frequency meter also can be termed an R. P. M. meter, since besides measuring the frequency of vibrations it is also employed during balancing to indicate the actual revolutions per minute of the rotation of the body X which is to be balanced. In setting up the cradle prior to a balancing operation, the meter 130 will be employed to indicate the frequency of vibrations of the cradle which will correspond to the rotation of the body X. When the actual balancing operations are being performed, the meter 130 will actually indicate the revolutions per minute of the body, as will later become apparent. As indicated in Figure 4, alternating current from a suitable source is brought into the cabinet E for the electronic equipment by means of a cable 131 having the conductors 132 and 133.

Figure 5:
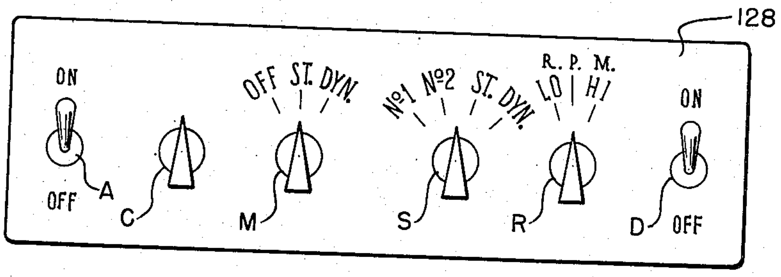
Figure 5 is an enlarged view of the switch panel.
Figure 9:
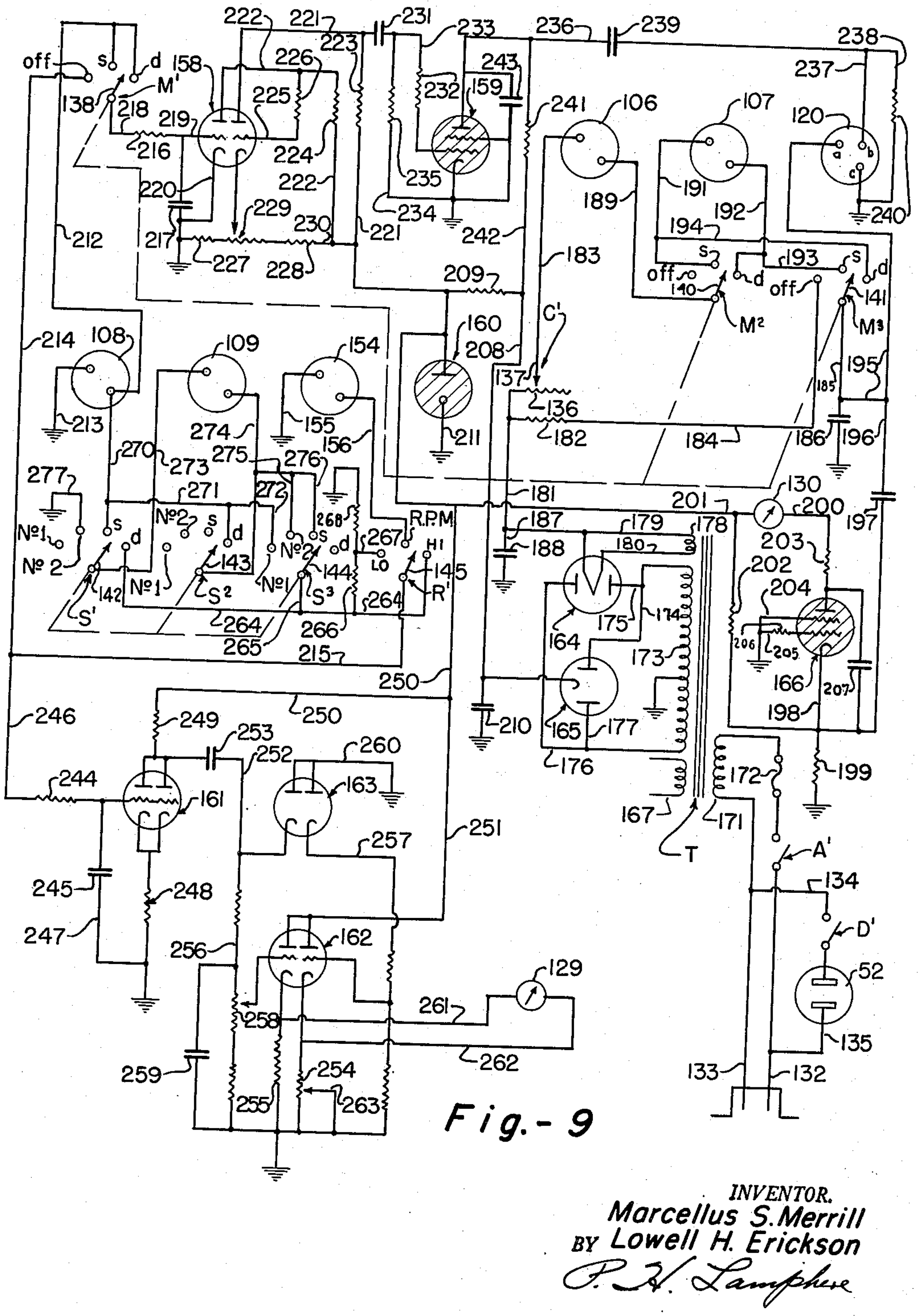
Figure 9 is a diagrammatic view showing the electrical connection of the various switches, electronic tubes, meters, etc. employed in the balancing apparatus and positioned in the cabinet unit.

Referring again to the control panel shown in Figure 5 and also to the wiring diagram of Figure 9, the control button A controls a switch A' in the conductor 132 employed for connecting the electronic circuit to the source of power. The control button D controls a switch D′ which is inserted in the conductor 134 which is employed to connect the line from the source of power to the previously referred to socket 52 into which the plug 51 of the cable 50 leading to the electric motor 43, already referred to, and employed in driving the belt which will rotate the body X which is to be balanced. By means of this switch D′ the motor can be started and stopped as desired. The control button C is employed to control a variable resistance indicated as $C^1$ on the wiring diagram of Figure 9 and comprising a resistance 136 and associated movable contact element 137 for varying the resistance. By means of this variable resistance $C^1$, the amplitude of the drivers can be varied as will become apparent.

The control button M is arranged to control three switches of the electronic circuit which are indicated as switches $M^1$, $M^2$ and $M^3$ on the wiring diagram in Figure 9. The movable contacts 138, 140 and 141 of these three switches are each arranged to cooperate with three fixed contacts which, for the purpose of clarity, are indicated on the wiring diagram as "off," "*s*" and "*d*." When the control button M is turned to the "off" position all the movable contacts will engage with the "off" fixed contact. When the button M is moved to the point marked "St," indicating "static" for a static balancing operation, all the movable contacts of the three switches will be on the fixed contact "*s*." When the button M is moved to the position marked "Dyn" for dynamic balancing on the control panel, all the movable contacts of the three switches will engage their fixed contacts "*d*." On the wiring diagram the movable contacts of all the three switches are indicated as being connected together for simultaneous movement by means of a dashed line.

The switch button S on the panel is arranged to have four positions which are indicated as No. 1, No. 2, "St" and "Dyn" and is arranged to control three switches indicated on the wiring diagram as $S^1$, $S^2$ and $S^3$. These switches have movable contacts 142, 143 and 144, all of which are connected together for simultaneous movement as indicated by the dashed lines. The three switches controlled by the button S are employed to variously connect the two pick-up assemblies into the electronic circuit. It is desirable to be able to independently connect either pick-up assembly into the circuit, to connect both pick-ups so that their voltage will be additive and to also connect both pick-up assemblies so that their voltage will be subtractive and out of phase by 180 degrees. To accomplish this it is convenient to provide four positions for each movable element of the three switches controlled by the button S. These four positions for the movable contacts are indicated by No. 1, No. 2, "*s*" and "*d*," all as shown on the wiring diagram. Of the four positions for the movable contact 142 in the switch $S^1$, there will be provided three fixed electrical contacts which correspond to the positions No. 2, "*s*" and "*d*." The movable contact 143 of the switch $S^2$ will have one fixed contact which will correspond to the position "*d*." The movable contact 144 will have three fixed contacts which will correspond to the positions No. 1, No. 2 and "*s*."

Control button R is arranged to have three positions which are indicated on the control panel as "Lo," "R. P. M." and "Hi" and the control button is arranged to control a switch $R^1$ of the electrical circuit, as indicated on the wiring diagram. The movable contact 145 of the switch $R^1$ is arranged to cooperate with three fixed contacts corresponding to the three positions of the control button, as indicated on the panel. These contacts are indicated on the wiring diagram by "Lo," "R. P. M." and "Hi." The switch $R^1$ is arranged to connect the R. P. M. meter 130 into the electronic circuit to measure the frequency of vibration as picked up by the pick-up assemblies and when this is done the control button can be either in the "Hi" or "Lo" position, depending upon the sensitivity desired.

When the button is placed on the "R. P. M." position, the R. P. M. meter 130 will be connected so as to indicate the actual speed of rotation of the body being balanced during the balancing operation. To accomplish this the R. P. M. contact of the switch $R^1$, as shown in the wiring diagram, is connected to a special R. P. M. pick-up which is generally indicated by the numeral 146 (see Figures 1, 3 and 8) and is mounted on the balancing machine so as to be associated with the shaft or arbor 41 of the body X to be balanced. This R. P. M. pick-up comprises a pick-up coil 147 with which is associated a soft iron core 148, the two poles thereof being arranged on opposite sides of one end of the shaft 41. This end of the shaft carries a brass extension 149 which is positioned in between the two poles of the iron core for the coil. Extending diametrically across this brass extension 149 is a magnetic core 150 in the form of a plug and will thus form a magnetic flux path between the two poles of the soft iron core during each 180 degrees of rotation of the shaft 41. Consequently there will be a change of magnetic flux in the iron core which will induce a voltage in the coil 147. The ends of the coil 147 have connected therein conductors 151 and 152 which extend through a suitable cable 153 having at its end a suitable plug (not shown) which can be connected into a socket 154 indicated on the wiring diagram of Figure 9. One receiving contact of the socket 154 is grounded by a conductor 155 and the other receiving socket is connected by a conductor 156 to the R. P. M. fixed contact of the already described switch $R^1$. With this arrangement it is seen that when the movable contact of the switch $R^1$ is on the R. P. M. fixed contact, the coil 147 of the R. P. M. pick-up associated with the end of the shaft 41 will be connected into the electronic hookup and by means of circuits to be later described the electrical impulses will be amplified and the R. P. M. meter 130 caused to indicate the speed of rotation of the body X which is to be balanced. The R. P. M. pick-up is arranged to be mounted by a suitable bracket 157 to the bearing frame 19 which carries the bearing wheels 20 and 21 mounted on the free end of the leaf spring 10, all as can be seen in Figures 1 and 3.

The electronic circuit shown by the wiring diagram of Figure 9 embodies nine electronic tubes indicated by the numerals 158, 159, 160, 161, 162, 163, 164, 165 and 166. The tubes 158, 161 and 162 are amplifying vacuum tubes of the duo triode type. Tubes 159 and 166 are special thyratron gas filled tubes. Tube 159 is employed as a trigger type tube for firing the Strobotron tube, already referred to. The function of this thyratron in the circuit is the same as that described in the co-pending application of Lowell H. Erickson, Serial No. 645,920, filed February 9, 1946, for Electronic Control. After the electrical impulses picked up by the pick-up assemblies are amplified, the tube 159 will function to cause the Strobotron tube to fire at a certain point on each cycle of mechanical vibration which is picked up, as will later become apparent. The tube 166, which is also a thyratron tube, is employed in the frequency measuring circuit of which meter 130 is a part. Tube 166 will be caused to fire only when the Strobotron tube is fired by means of the circuit associated therewith and current will be caused to flow through the meter 130 as will become apparent. The tube 160 is a gas filled tube having a cold cathode and is employed as a voltage regulator. The tube 163 is a duo diode vacuum tube used in the manner of a half wave rectifier unit. Tube 164 is a full wave, high vacuum rectifier tube, as is also the tube 165.

Figure 10:
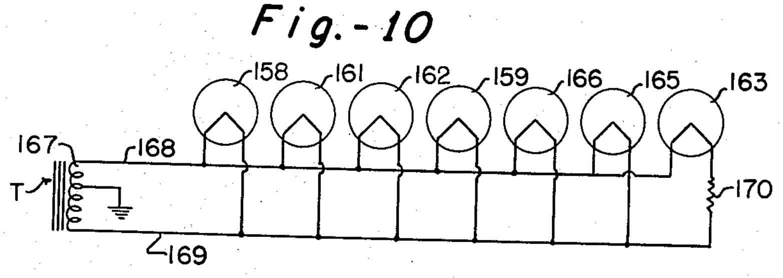
Figure 10 is a diagrammatic view showing the electrical connections of the filament or heating elements of the various tubes.

In the wiring diagram of Figure 9 the connections for the heater elements associated with the cathodes of the tubes 158, 159, 161, 162, 163, 165 and 166 are not disclosed. These heater element connections, however, are shown in the separate Figure 10 for purposes of simplicity. A secondary coil 167 coming from the transformer T of the circuit has one end connected by a conductor 168 with one end of the heater coil of each of the mentioned tubes and its other end connected by conductor 169 with the other end of the heater coils of the said tubes. A resistance 170 is provided in the circuit and the secondary coil 167 of the transformer is grounded as indicated.

The conductors 132 and 133 coming from the line and source of electricity for the electronic circuit are connected to a primary winding 171 of the already mentioned transformer T. Also interposed in the circuit is a fuse 172. The transformer T has a secondary winding 173 for rectifying the portion of the electronic circuit which is grounded intermediate its ends as indicated. Conductors 174 and 175 connect one end of the secondary winding to a plate of each of the rectifier tubes 164 and 165. Other conductors 176 and 177 connect the other end of the secondary winding 173 with the other plates of said two rectifier tubes 164 and 165. A third secondary winding 178 of the Transformer T, having a small number of turns, has its ends connected by conductors 179 and 180 to furnish power to the filament of the rectifier tube. The conductor 179 is also connected by a conductor 181 to the previously mentioned variable resistance $C^1$ and a resistance 182. The movable contact 137 of the variable resistance which is controlled by button C on the control panel, is connected to one of the receiving contacts of socket 106 by a conductor 183 to thus furnish power to the driver assemblies. A conductor 184 leads from fixed resistance 182 to the "off" contact of the switch $M^3$. The movable contact 141 of this switch $M^3$ is connected by conductor 185 to one side of a high capacity condenser 186 which has its other side grounded as shown. The purpose of this high capacity condenser is to cause the driver assemblies to be energized whenever the Strobotron tube is fired so that said driver assemblies will be so synchronized with the natural frequency of the cradle that sustained self-oscillation of the cradle at resonance can be established. Power will flow to the driver assemblies during re-charging of the condenser 186. The condenser is discharged by the firing of the Strobotron tube as will later become apparent. Conductors 179 and 181 are connected by a conductor 187 to one side of a filter condenser 188, the other side of which is grounded.

The switches $M^2$ and $M^3$ are employed to cause the driver assemblies to be in phase or out of phase by 180 degrees. The switches are, in effect, nothing more than reversing switches. The receiving contact of socket 106 is connected by a conductor 189 with the movable contact 140 of the switch $M^2$. The "*s*" contact of the switch $M^2$ is connected by the conductor 191 with the other driver assembly connecting socket 107. A conductor 192 connects the other receiving contact of the socket 107 with fixed contact "*d*" of switch $M^2$ and also the fixed contact "*s*" of switch $M^3$ by means of a parallel conductor 193. The fixed contact "*d*" of the switch $M^3$ is connected by a parallel conductor with the conductor 191 which has been previously mentioned as connecting the fixed contact "*s*" of the switch $M^2$ with a receiving contact of socket 107. The "off" contact of the switch $M^2$ is a blank position. Thus when movable contacts of the switches $M^2$ and $M^3$ are in the "off" positions, switch $M^2$ will be open so that the drver assemblies will not be capable of being energized for operation.

With the above described circuits controlled by the switches $M^2$ and $M^3$ it is seen that when the control button M of the panel is in the "St" position, wherein the movable contacts of the switches $M^2$ and $M^3$ are in the "*s*" positions, the driver assemblies will be connected so they are in phase and thus transmit mechanical vibrations to the two leaf springs of the cradle. If the button M should be turned to the "Dyn" position, then the movable contacts of the two switches will be placed on the "*d*" contacts and thus the driver assemblies will be connected reversely so as to oppose each other and, therefore, the impulses transmitted by the driver assemblies to the leaf springs will be out of phase by 180 degrees, thus causing the shaft on which the body X is rotated to have a rocking movement.

The conductor 185 which connects the driver assemblies to the high capacity condenser 186 has connected thereto a conductor 195 leading to the receiving contact "*a*" of the socket 120 to which the Stroboscopic device is connected. With this connection to the Strobotron tube the high capacity condenser will be discharged when the Strobotron tube is fired. There will then be a flow of current to recharge the condenser and this flow will be through conductors 179 and 181 and the coils of the two driver assemblies and thus energize them so they can add an impulse to the natural frequency of the cradle.

Conductor 196 leads from the conductor 195 to connect the Strobotron tube and the condenser 186 with the frequency measuring portion of the circuit so that the frequency meter 130 can perform its measuring functions. Conductor 196 is connected to one side of a condenser 197 and the other side of said condenser is connected by a conductor 198 to the cathode of the thyratron tube 166. The cathode and condenser 197 are grounded through a suitable resistance 199. The condenser 197 and the grounded resistance 199 form a circuit which is similar to a differentiating circuit so as to obtain proper timed firing of the thyratron tube 166 in the frequency measuring circuit in relation to Strobotron tube firing. The plate of the thyratron tube is connected by a conductor 200 to one terminal of the frequency meter 130, the other terminal of which is connected by a conductor 201 to pick off power from the voltage regulator tube 160. A resistance 202 is connected across the tube 166 from the cathode to the conductor 201. This resistance 202, together with the resistance 199 in the cathode circuit, biases the tube 166 so that it will not normally fire. A resistance 203 is also provided in the plate circuit. The two grids of the tube are connected by conductors 204 and 205 to ground and if desired there can be associated with one of the grids a resistance 206. The condenser 207 is connected across the tube between the conductor 200 and conductor 198, which condenser is employed for controlling the flow of current through the meter 130.

With the thyratron tube 166 normally biased not to fire, then whenever the Strobotron tube is caused to fire there will be a discharge of the condenser 186, as already mentioned. Simultaneous with this discharge there will be a discharge of condenser 197 which will result in the firing of thyratron tube 166. The firing of the tube will discharge condenser 207 and current will then flow through the frequency meter 130 to recharge condenser 207. The thyratron tube will be fired each time that the Strobotron tube is fired and since the Strobotron tube is fired once each cycle of vibration picked up by the pick-up assemblies, the thyratron tube will also be fired for each cycle of vibration. Consequently there will be a flow of current through the meter 130 each cycle of vibration and the meter will consequently indicate the frequency of vibration.

Power from the rectifier tube 165 of the dual power pack has its voltage regulated by voltage regulator tube 160. The cathode of tube 165 is connected to the place of the voltage regulator by a conductor 208 through a resistance 209. A filter condenser 210 is connected to the conductor 208 which grounds only the alternating current, the direct current being blocked. The cold cathode of the voltage regulator is grounded by conductor 211.

Voltage regulated power is employed to amplify the current induced into the two pick-up assemblies and to fire the Strobotron tube. In setting up the cradle for self oscillation at resonance the induced voltage in one pick-up assembly is employed to cause the driver assemblies to apply a force to the cradle which will be in tune with the natural frequency of the vibrations of the cradle after said cradle has been caused to begin to oscillate, preferably by a manual start. To cause the driver assemblies to apply their force at the proper time so as to bring the cradle into resonance prior to the performing of any balancing operation, it is necessary to employ the induced voltage in one pick-up assembly which can be referred to for the purpose of convenience as the No. 1 pick-up assembly, such assembly being the one (assembly 54) connected into the socket 108 in the wiring diagram of Figure 9. The No. 1 pick-up assembly is adapted to be connected to cause proper firing of the Strobotron tube and also energization of the driver assemblies whenever these assemblies are connected into the circuit by the switches M² and M³, regardless of whether the driver assemblies are connected to operate in synchronization or out of phase by 180 degrees. The switching in of the single pick-up assembly, when the driver assemblies are to function during the setting up of the cradle for self oscillation at resonance, is accomplished by the previously referred to switch M¹ which is already mentioned as being controlled by the panel button M also controlling the reversing switches M² and M³. It will be noted on the wiring diagram that one receiving contact of the socket 108 for the indicated No. 1 pick-up assembly is connected by a conductor 212 with both the fixed contacts "s" and "d" of the switch M¹. The other receiving contact of the socket 108 is connected to ground through a conductor 213. When it is desired to connect both pick-up assemblies into the circuit, such will be accomplished by the switch M¹ when it is placed upon the "off" fixed contact, which contact is connected to the pick-up assemblies through the conductors 214 and 215 and the switches S¹, S² and S³ which have already been mentioned as being employed to connect said pick-up assemblies either individually or together in such a manner that their induced voltages will be either additive or subtractive. The connections between the switches S¹, S² and S³ for accomplishing the various connections of the pick-up assemblies into the circuit by way of the conductors 214 and 215 and switch M¹ will be later described.

The voltages induced into the pick-up assemblies, regardless of how connected into the system, will be employed to cause firing of the Strobotron tube once each cycle of the vibration. This firing of the Strobotron tube is accomplished by means of the already mentioned amplifying tube 158 and thyratron or trigger tube 159 and the manner in which they are connected into the electronic circuit. The induced voltage which is coming from a pick-up assembly or both pick-up assemblies must be first integrated in order to get a voltage that will be proportioned to displacement and not to velocity. Due to the functioning of the integrating circuit, considerable voltage will be lost and, therefore, it will be necessary to amplify the remaining voltage in order to obtain sufficient voltage to control the firing of the Strobotron tube. The amplifying is done by means of the duo triode vacuum tube 158. As shown in the wiring diagram of Figure 9, the integrating circuit comprises a resistance 216 and a grounded condenser 217 connected to the movable contact 138 of the switch M¹ by means of a conductor 218. The grid of the first half of the amplifying tube is connected to the integrating circuit between the resistance 216 and the condenser 217 by a conductor 219. The ground side of the condenser is connected to the cathode of the first half of the tube by a conductor 220. Both plates of tube 158, the other grid and both cathodes are also connected so as to receive voltage regulated power. As can be seen in the wiring diagram, parallel conductors 221 and 222 connect both plates to the voltage regulator and there is provided suitable resistances 223 and 224. The conductor 225 and a resistance 226 couple the grid of the second half of the tube to the conductor 222. Resistances 227, 228 and variable resistance 229 connected to the voltage regulated power by conductor 230, and to the cathode of the second half of the tube and to ground, provide a potential divider to properly bias the second half of the amplifying tube.

The thyratron or trigger tube 159 which controls the firing of the Strobotron tube has amplified periodic signals from the amplifying tube impressed on one of its grids, the connection being made through a condenser 231, a resistance 232 and a conductor 233. The cathode of the tube is biased by being connected to conductor 233 through a conductor 234 and resistance 235 as shown. The plate of the thyratron tube 159 is connected through conductor 236 and parallel conductors 237 and 238 with the "b" and "c" receiving contacts of the Strobotron socket 120. A condenser 239 and a resistance 240 are provided in this connecting circuit. Condenser 239 is susceptible of being charged by power from the rectifier tube 165 of the power pack through a resistance 241 and conductor 242. A condenser 243 is connected across the tube 159 between the plate, the cathode and the other grid and is grounded, all as shown in the diagram.

A detailed description of the functioning of the trigger tube is not believed necessary to understand the functioning of the present balancing machine as this is all set out in the previously referred to co-pending application of Lowell H. Erickson, Serial No. 645,920 filed February 9, 1946, for Electronic Control. Briefly described, when the signal from a pick-up assembly or both pick-up assemblies has been integrated and amplified by the tube 158 and the circuit associated therewith, it will be impressed on the indicated grid of the thyratron tube 159. When the grid potential reaches a critical value the tube fires and condensers 243 and 239 will be discharged. This causes a sharp potential drop and such will result in the firing of the Strobotron tube.

The amplitude measuring portion of the electronic circuit is of well known arrangement and comprises the amplifying tube 161, the rectifying tube 163 and a vacuum tube 162, together with an integrating circuit associated with the amplifying tube 161 and a bridge circuit including the necessary resistances associated with the plate resistances of tube 162 whereby the meter 129, when connected across the bridge, can indicate the amplitude of the vibrations of the cradle which are picked up by the pick-up assemblies, either individually or in combination. The integrating circuit comprises a resistance 244 and a condenser 245 connected to receive induced voltages from the pick-up assemblies by means of a conductor 246. The condenser 245 is coupled with the grid and the cathodes of the tube 161 by the conductor 247 and the condenser and cathodes are grounded as shown. There is also provided in the connection between the condenser and the cathodes a resistance 248. The plates of the amplifying tube are connected through a resistance 249 to receive power from the voltage regulator 160 by means of a conductor 250. The conductor 251 also connects the plates of the tube 162 to receive power from the voltage regulator 160. The amplified voltage from the tube 161 is connected to the tubes 163 and 162 by a conductor 252 through a condenser 253. The resistances 254 and 255 of the bridge portion of the circuit are associated with the cathodes of the tube 162 and these resistances are coupled together and to the cathodes of the rectifying tube 163 by way of conductors 256 and 257 in the manner shown. Suitable resistances are employed in these connections as indicated. Also connected across the parallel conections between the cathodes of the two tubes is the grid of the vacuum tube 162. Associated with one of the grid connections is a variable resistance 258 which is shunted by condenser 259. The plates of the rectifying tube 163 are connected to ground through the conductor 260. The amplitude measuring meter 129 is connected across the resistances 254 and 255 by the conductors 261 and 262. The bridge resistance 254 is a variable resistance and movable contact 263 is connected into the circuit as shown. By making the resistance 254 variable, zero adjustment of the bridge can be made.

The electrical impulses being picked up by the two pick-up assemblies plugged into the sockets 108 and 109 are connected into the amplifying circuit through the movable contact 145 of the switch $R^1$ when on either the "Hi" or "Lo" contacts, it being noted that this movable contact 145 is connected to the conductor 215 which leads to the $M^1$ switch. When the movable contact 145 of the $R^1$ switch is on the R. P. M. contact, it will directly connect the conductor 156 to the conductor 215 and thus connect the R. P. M. pick-up 146 into the circuit so that the meter 130 can indicate the actual speed of rotation. When the movable contact 145 is on either the "Hi" or "Lo" contacts, it will connect the pick-up assemblies to the conductor 215 and through it to the tubes and circuit for firing the Strobotron tube and also the amplitude measuring circuit so that the meter 129 can indicate the amplitude of the vibrations being picked up. To accomplish this the "Hi" fixed contact of the switch $R^1$ is connected by a conductor 264 to the fixed contact "*d*" of the switch $S^1$ and also through a parallel conductor 265 with the movable contact 144 of the switch $S^3$. The "Lo" fixed contact of the switch $R^1$ is connected into the conductor 264 through a resistance 266 and a conductor 267. This "Lo" contact is also grounded through a resistance 268. The various connections between the switches $S^1$, $S^2$ and $S^3$ for connecting the pick-up assemblies either independently, in series or in parallel with the "Hi" and "Lo" fixed contact of the switch $R^1$ will now be described. One of the receiving contacts of the socket 108 is connected to ground through a conductor 213. The other receiving contact of this socket (to which receiving contact the previously mentioned conductor 212 is connected) is connected by a conductor 270 and parallel conductors 271 and 272 with the fixed contact "*s*" of switch $S^1$, the fixed contacts "*d*" with switch $S^2$ and the No. 1 contact of switch $S^3$. The other pick-up assembly socket 109 has one of its receiving contacts connected by a conductor 273 with the movable contact 142 of switch $S^1$. The other receiving contact of said socket 109 is connected by a conductor 274 with a movable contact 143 of switch $S^2$. Parallel connected conductors 275 and 276 also connect the conductor 274 with the No. 2 and "*s*" contacts of switch $S^3$. The No. 2 contact of switch $S^1$ is grounded by a conductor 277. In the three switches $S^1$, $S^2$ and $S^3$ the No. 1 contact of switch $S^1$, the No. 1, No. 2 and "*s*" contacts of switch $S^2$ and the "*d*" contact of switch $S^3$ have no connections and are merely indicative of the positions of the movable contacts of the switches.

By following through the connections already mentioned it will be seen that when the switches $S^1$, $S^2$ and $S^3$, which are all connected together to be moved by the panel button S, are placed so that the movable contact elements are at the No. 1 position, the pick-up assembly connected to the socket 108 will be the only pick-up assembly connected into the conductor 264 and if the switch $R^1$ is at "Lo" or "Hi" it will be connected into the electronic circuit through the conductor 215. If the movable elements of the switches should be placed on the No. 2 position, it will be seen that the other pick-up assembly which is connected to the socket 109 will be connected into the electronic circuit. Assuming that both pick-up assemblies are moving in phase, then when the movable contacts of the switches are at the "*s*" position the two pick-up assemblies will be so connected into the circuit that the induced voltages of the pick-up assemblies will be additive and when the movable elements of the switches are at the "*d*" position, the two pick-ups will be so connected that the induced voltages will be subtractive.

*Pre-balance calibration setup of cradle*

In practice in balancing any body, the principal difficulty has been to determine certain unknown factors before the actual balancing procedure can be completed. According to known methods of balancing, it is the practice to put a rotor or other body in a cradle, but the placement of this body in the cradle itself gives many unknowns that have to be determined. One of the main advantages of our method of balancing is to make the preliminary setup prior to actual balancing very much quicker and also much simpler than in any other methods we know. We do this by causing the body in the cradle, while the body is at rest, to have sustained oscillation at resonant frequency and from observations and measurements of the movement of the body we determine the factors necessary to know in order to properly balance it. To accomplish this by the structure, together with the electronic hookup already described in detail, the body to be balanced, together with the shaft 41 upon which it is mounted, is placed on the cradle by means of positioning the ends of the shaft on the bearing wheels mounted at the free ends of the two leaf springs. After this is done the electronic circuit is connected to the source of electricity or line by closing the switch $A^1$, accomplished by the placing of the button A on the panel in the "on" position. The button M is placed at the "St" position. This position of button M will place the movable contacts of the switches $M^1$, $M^2$ and $M^3$ on their "*s*" contacts. As a result of positioning of these switches, the No. 1 pick-up assembly 54 will be connected so that its induced voltage will be directly fed into the amplifying circuit through the conductor 212 and the switch $M^1$. The positioning of the movable contacts of the switches $M^2$ and $M^3$ on the "*s*" contacts will also result in the drivers being connected so that their impulses, when they are energized, will be transmitted to the cradle in phase, that is, they will give a motion to the two leaf springs in the same direction and at the same time. The button S is placed at the "Dyn" position which will result in the movable contacts of the switches $S^1$, $S^2$ and $S^3$ being placed on the "*d*" contacts. This will connect the pick-up assemblies into the circuit so that the induced voltages will be subtractive or opposing each other. The induced voltages will be fed into the amplitude measuring circuit through conductor 215 and will be registered on the amplitude meter 129. The button R will be placed on the "Hi" position so that the full induced voltages which are coming from the two pick-up assemblies will be as large as possible.

With the body to be balanced mounted on the cradle and with these conditions of the switches as described, the body X in a non-rotating condition will then be caused to begin to oscillate on the yieldable cradle. This can be done manually by merely tapping the body X with the hand so that it and the springs will vibrate. As soon as the cradle begins to vibrate the amplitude meter will begin to register the difference between the amplitudes of the voltages induced into the two pick-up assemblies. After the cradle and body have been vibrating a few seconds they will attain a condition of sustained oscillation at a predetermined frequency. The amplitudes of the vibrations of the two springs, however, will probably not be equal or in phase because the body is not centered between the springs, nor is the vibration factors of the springs the same. The next step in setting up the resonant cradle is to bring the vibrations of the two leaf springs of the cradle into phase and approximately equal. This is accomplished by making an adjustment of one or both of the fulcrums of the leaf springs. When the vibrations are in phase and approximately equal, such will be shown by the amplitude meter 129 as it will then have a zero or substantially zero reading. When the springs are adjusted so that the vibrations at the ends thereof are in phase, the vibrating system which will include the cradle, the body to be balanced, the shaft and the other structure associated with the springs, will have sustained oscillation at resonant frequency, this frequency being static resonant frequency.

Sustained oscillation at static resonant frequency is established by the functioning of the two drivers which, as already mentioned, are connected so that their impulses are synchronized. These impulses, as will become apparent, are applied to the cradle system so as to be in tune with the natural frequency of the system. It has already been noted that the switch $M^1$ is so set that the No. 1 pick-up assembly 54 connected to socket 108 is having its induced voltage "fed back" into the integrating circuit and the amplifying circuit which includes the tube 158. This "fed back" voltage, which by the integrating circuit will be proportional to displacement, will result in the Strobotron tube being fired or flashed, which firing is brought about through the thyratron tube 159 so functioning in the circuit that at the instant the displacement voltage goes positive, current will flow to the Strobotron tube and cause it to fire. The Strobotron tube, therefore, will be fired on each vibration of the cradle and at a definite point in the cycle of vibration. The Strobotron tube firing controls the energization of the two driver assemblies through charging of condenser 186. When the Strobotron tube is fired, the condenser 186 will be discharged and the recharge current will then flow through the two drivers. When the current flows through the drivers, which it will be remembered are connected so that their impulses will be synchronized, the drivers will add an impulse to the vibrating cradle which will be in tune with the natural frequency of the cradle with the body therein. The mechanical impulse which is being transmitted to the vibrating cradle by the two driver assemblies will thus maintain the cradle in sustained oscillation at the static resonant frequency of the system. It will be particularly noted that the driver assemblies always are so energized that they add their impulse to the vibrating cradle at the proper time since the impulses occur only when the Strobotron tube is fired and this firing is controlled by the induced voltage of the No. 1 pick-up assembly. The integrating circuit, the amplifying tube and the thyratron tube 159 so control the induced current that firing of the Strobotron tube occurs once during each cycle of vibration of the cradle.

The frequency meter is operated when the Strobotron tube is fired during a cycle of vibration of the cradle. The condenser 197 will be discharged and as a result the thyratron tube 166 will be caused to fire. This tube 166 is prevented from normally firing by the normal bias of the tube resulting from current flow through the cathode resistor 193 of the tube. When the tube 166 fires, the condenser 207 will be discharged and after this discharge current will then flow through the frequency meter 130 so that said meter can measure the frequency of the vibrations. If it should be desired to regulate the amplitude of the impulses of the driver assemblies, such can be accomplished by controlling the button C on the panel which will control the variable resistance 136 forming a part of the circuit for the two driver assemblies.

With the cradle having sustained oscillation at static resonant frequency, it is now possible to obtain data which will be useful in the subsequent balancing operations. It will be remembered that during the setting up of the resonant cradle the button S of the panel is placed at the "Dyn" position in order that the two pick-up assemblies will be connected into the amplitude measuring circuit so that an adjustment of one or both of the leaf springs can be made to bring the amplitudes of the vibrations of the leaf springs into phase. With the cradle still oscillating at resonance, the button S can be moved over to the "St" position and this will connect the pick-up assemblies so that their voltages are additive. With the voltages additive the reading on the frequency meter 130 will be the static resonant speed of the body X. By having the voltages additive there will not be a false meter reading as would be the case were the voltages subtractive, since in the latter case extraneous vibrations may give false readings. In other words, it will be the resonant speed of the rotating body at which the static unbalancing forces are determined. The reason that it is the resonant speed for static unbalance is that the pick-up assemblies will be additive and only such vibrations as are caused by the static unbalance of the body to be balanced will be picked up by the pick-up assemblies. The result will be a separation of the vibrations causing static unbalance from the vibrations causing dynamic unbalance. It is well known that a static unbalance is produced by a net unbalanced radial force. Therefore, when the body is rotating the net unbalanced radial force will be picked up by the two pick-up assemblies when they are connected to be additive. The induced voltages from the net unbalanced radial force will be of such magnitude that it will be recorded to a much greater extent than any forces resulting from a dynamic unbalance. Dynamic unbalance is produced by a net couple acting about an axis which is at right angles to the axis of rotation of the body. The dynamic unbalancing forces can, therefore, be picked up separate from the static unbalancing forces by the two pick-up assemblies whenever they are connected to be out of phase by 180 degrees. When the S button is on "St" the amplitude meter will indicate the amplitude of the vibrations being caused by the static unbalance.

After the frequency meter reading has been obtained, with the button S at the "St" position, which is the resonant speed for determining static unbalance, both the buttons S and M will be placed at the "Dyn" position. The frequency meter reading is then taken, which will be the resonant speed at which dynamic unbalance is determined. The reading of the frequency meter will indicate the revolutions per minute of resonant speed for determining either static or dynamic unbalancing because the readings were taken with the cradle and supported body to be balanced at resonance. The reading of the amplitude measuring circuit will indicate the amplitude of the vibrations caused by the dynamic unbalancing forces, as then the driver assemblies are out of phase by 180 degrees and, consequently, the dynamic unbalancing forces will be separated from the static unbalancing forces and these dynamic forces will be the only forces picked up by the pick-up assemblies.

It is true that if a body is vibrating at resonance, and regardless of whether it is rotating or not rotating, the amount of amplitude of the vibrations will not be dependent on the mass of the body, provided the critical frequency is made the same for all bodies. The peak amplitude of the vibrations at resonance is limited only by the amount of damping in the system and the resonant frequency. Damping is introduced into the present system by the means of the dash pots associated with the leaf springs of the cradle. Consequently, the peak amplitude will be limited in the particular balancing machine shown.

With the forementioned truths in mind, it becomes obvious that the proper and accurate method of determining static and dynamic unbalance of a rotatable body is to do so when the body is vibrating at resonance. Thus, by setting up the resonant cradle, which is accomplished by causing the cradle and body to have sustained oscillation at resonant frequency of the system, it can be determined what will be the resonant speed at which to calculate the amount of static unbalance and thus make the necessary corrective measures and the resonant speed at which to calculate the amount of dynamic unbalance and make the necessary corrective measures. The amplitudes of the vibrations caused by the static and dynamic unbalancing forces at resonance are obtained from the amplitude meter 129.

Figure 13:
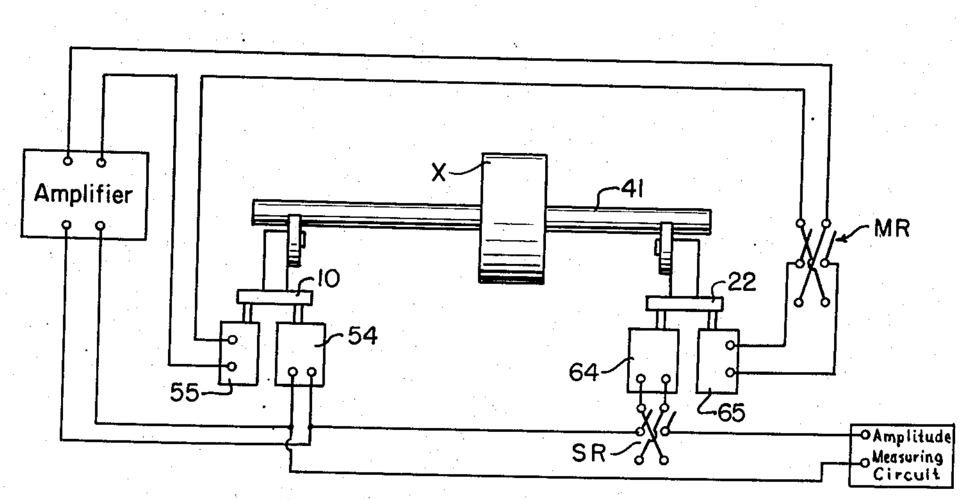
Figure 13 is a schematic view including a wiring diagram showing the elements of the balancing apparatus employed in setting up the resonant cradle structure prior to performing balancing operations.

In order that the method of setting up the resonant cradle so that said cradle will have sustained oscillation at resonance can be better understood, reference is had to Figure 13 wherein a schematic diagram is employed to illustrate the method. The body X to be balanced and the shaft 41 whereby it is supported for rotation on the yieldable leaf springs 10 and 22 of the cradle are shown in a simplified manner. The driver assemblies and the pick-up assemblies are shown associated with the leaf springs of the cradle and are indicated by the same numerals employed in indicating these elements on the previously described machine. The amplifying circuit which will include the integrating circuit, the amplifying tube 158 and the trigger tube 159 for firing the Strobotron tube and causing the driver assemblies to be energized are all within the indicated "amplifier" box. In a similar manner the amplitude measuring circuit, which will include the amplitude meter, is in the box indicated as the "amplitude measuring circuit." The driver assemblies are shown as connected into the amplifier and a reversing switch MR is indicated to show that these assemblies can be connected either additively or subtractively. The pick-up assemblies are shown as being connected into both the "amplifier" and the "amplitude measuring circuit" and there is provided a reversing switch SR for connecting the pick-up assemblies so that their impulses will be either additive or 180 degrees out of phase. The reversing switch MR functions in the schematic showing the same as the switches $M^2$ and $M^3$ do in the wiring diagram of Figure 9 and the reversing switch SR functions in the same manner as the switches $S^1$, $S^2$ and $S^3$ in said wiring diagram.

From the schematic diagram in Figure 13 it can be readily seen that when the body X and the cradle are caused to have vibration as a result, for example, of a manual start, the induced voltage of the No. 1 pickup 54 will be fed into the amplifier and by means of this amplifier the drivers 55 and 65 will be given "in phase" impulses which will be in tune with the vibration of the yieldable cradle and the body X which is to be balanced, provided, of course, that the reversing switch MR is in a position so that the impulses of the drivers are in the same direction. By throwing the switch SR to the proper position so that the voltages of the two pick-up assemblies are 180 degrees out of phase, the amplitude measuring circuit will indicate whether the vibrations of the two springs are in phase or out of phase. If there is a reading on the amplitude meter, the amplitudes will be out of phase and of course can be brought into phase by adjustment of one or both of the springs of the cradle. When this is done the cradle will have sustained oscillation at resonant frequency of the system with both springs vibrating in phase. The switch SR is then thrown so that the pick-up assemblies 54 and 64 are additive and the amplitude of the vibrations caused by static unbalance will be indicated on the amplitude meter. By throwing the switch MR so that the driver assemblies are out of phase 180 degrees and also throwing the switch SR so that the pick-up assemblies are connected to be subtractive, the amplitude of the vibrations resulting from the dynamic unbalance will be indicated by the amplitude meter.

For all practical purposes when the cradle and body are set up to have sustained oscillation at the static resonant frequency of the system, that is, with the impulses from the driver assemblies acting in phase in the same direction and the springs adjusted to have their amplitudes in phase, the system is also set up to have sustained oscillation at the dynamic resonant frequency of the system, that is, with the impulses from the driver assemblies acting in phase in opposite directions and the springs adjusted to have their amplitudes 180 degrees out of phase. Thus setting up the cradle and body so as to have sustained oscillation at the static resonant frequency of the system is sufficient so that both static and dynamic balancing operations can be performed satisfactorily on like bodies, one of which will be used in setting up the resonant cradle. In the event the setting up of the cradle so as to have sustained oscillation at static resonant frequency of the system is not also satisfactory for dynamic balancing operations, then the cradle can be set up specially for such operations by causing the driver assemblies to be 180 degrees out of phase and the fulcrums of the springs so adjusted relatively to each other that the phase relationship of the amplitudes of vibrations of the springs will be 180 degrees out of phase.

*Balancing procedure*

After the resonant cradle has been set up in the manner already set forth, the balancing operations can then be performed. These balancing procedures can then be accomplished by rotating the body to determine where necessary corrective weights must be positioned in order to bring about both a static and dynamic balance. It will be recalled that data was obtained from the frequency meter when the cradle and body were oscillating in resonance with the driver assemblies connected to give impulses in the same direction and the pick-up assemblies are connected to be additive, and that data was also obtained from the frequency meter when the driver assemblies are connected to give impulses 180 degrees out of phase and the pick-up assemblies are connected so that the voltages are 180 degrees out of phase.

In performing the balancing operations it is not necessary to use the two driver assemblies as these are employed only in setting up the resonant cradle. All that is necessary is to pick up the vibrations caused by static and dynamic unbalance forces and of course this is done solely by the use of the two pick-up assemblies. In order to cut out the driver assemblies, the button M on the control panel will be moved to the "off" position. This positioning of the button M will place the movable contact of the switch $M^1$ on the "off" contact and consequently will connect either one or both of the pick-up assemblies into the amplifying circuit, depending of course upon the condition of the switches $S^1$, $S^2$ and $S^3$. In performing the static balancing operations, it is necessary to have the pick-up assemblies connected to be additive and, therefore, the switch button S is moved to the "St" position which will place the movable contact of the switches $S^1$, $S^2$ and $S^3$ on the fixed contacts "*s*." In performing both the static and dynamic unbalancing operations the control button R on the control panel will first be placed at the R. P. M. position. This, of course, will connect the R. P. M. pick-up 146 into the circuit so that the frequency meter 130 can indicate the actual speed of revolutions of the rotating shaft. The R. P. M. meter is used only during "reving up" the body X so that the operator will know when the body is rotating above resonant speed. When the button R is at R. P. M. position the pick-up assemblies will not be connected into the circuit.

The body to be balanced is now ready to be rotated so as to determine where the corrective weights should be placed to eliminate static unbalance. Before performing the balancing operation, however, a suitable check mark should be placed on the periphery of the body to be balanced, which mark can be merely a chalk mark. To "rev up" the body X the motor 43 will be started by throwing the D button to "on" position, thus closing the switch $D^1$. The handle 49 will then be grasped and the arm 42 moved to bring the moving belt into engagement with the peripheral surface of the body X. This will start the rotation of the body X and the shaft and they should be rotated to such a speed as to be above the resonant speed of the body. This can be determined by watching the frequency meter 130, which it will be remembered is measuring revolutions per minute of the shaft 41 through the functioning of the speed pick-up assembly 146. After the body X is rotating above resonant speed, the button R is thrown to either the "Hi" or "Lo" positions, whichever is necessary to keep the needle of the meter 130 on the scale. If the meter goes off the scale with the button at "Hi," then it should be shifted over to "Lo." When the button R is on either "Lo" or "Hi" the two pick-up assemblies will be connected so that their additive induced voltages will be connected to the amplifying circuit and the amplitude measuring circuit. Consequently the Strobotron tube will begin to fire on each revolution of the rotating body, said firing being caused by the vibrations set up by the net static unbalancing force. The stroboscopic lamp B is now placed so that the light caused by the firing of the Strobotron tube will be directed onto the side of the roating body having the check mark. This check mark will appear to stand approximately still as it can only be viewed under the light once each revolution since the Strobotron tube is being fired once every revolution. As the rotating body slows down, it will pass through resonant speed. When resonant speed is reached, it will become known by checking the frequency meter, it being recalled that this resonant speed was determined from the frequency meter after the resonant cradle was set up by connecting the pick-up assemblies so that their induced voltages are additive while the two driver assemblies were connected to give "in phase" impulses to the cradle. Resonant speed can also be checked, if desired, by reading the amplitude meter as such will be indicated by its peak reading. As the rotating body passes through resonant speed, the clock position of the check mark should be noted and also the reading of the amplitude meter 129 for it is this reading of the amplitude meter which indicates the magnitude of the corrective weight which is necessary to eliminate the static unbalance. The rotating body X is now stopped and the body turned so that the check mark is at the same clock position as it was when viewed under the stroboscopic lamp with the body rotating at resonant speed. With the body now so positioned, the corrective weight will be placed at the top of the body or the 12 o'clock position on the stopped body. The selected weight will be calculated from the amplitude meter reading which was taken at resonant speed. The greater the meter reading, the greater will be the necessary corrective weight. The operator of the machine can judge the necessary weight from the amplitude meter reading after performing a few balancing operations. The reason that the weight is always placed at the 12 o'clock position on the body is that the net unbalancing weight will always be at the 6 o'clock position since it will be in this position when its produced vibration wave is picked up by the pick-up assemblies in the particular balancing apparatus disclosed by way of example. If desired, the vibration caused by the net unbalancing weight can be picked up at any other position and in such instance the balancing weight will be positioned diametrically opposite. This can be done by proper changes in the electronic circuit.

To determine whether the proper corrective weight has been placed on the body to eliminate static unbalance (this weight is generally temporarily attached as by tape), the body can again be rotated up to a speed above resonant speed and another test made when the rotating body passes through the resonant speed. If the added weight is correct to eliminate static unbalance, then at resonant speed the amplitude meter will indicate zero or substantially zero. If zero reading is not shown by the amplitude meter, then it means that the wrong weight has been placed on the body. If too much weight has been placed on the body, then this will be indicated by the shift in the position of the added weight toward the bottom. If too little weight is used, then the added weight will remain at top. After a different weight is placed on the body in place of the one first placed thereon, another recheck run is made to see if the static unbalance has been properly corrected. This is repeated until the proper weight gives zero reading on the amplitude meter 129. This will conclude the balancing operations to eliminate static unbalance of the rotating body.

To perform the dynamic balancing operations the button M is left at the "off" position so that the driver assemblies will remain "cut out" and the pick-up assemblies will remain connected to fire the Strobotron tube through the amplifying circuit and the trigger tube 159. The button S is placed at the "Dyn" position so that the movable contacts of the three switches $S^1$, $S^2$ and $S^3$ will be at the "*d*" contacts. This will connect the pick-up assemblies so that their induced voltages will be out of phase by 180 degrees. The R button is placed on the R. P. M. position where it will remain during the "reving up" of the body X. The motor 43 is now started by throwing the button D to close the motor circuit and next the arm 42 is manually operated to bring the moving belt into contact with the body X to cause it to rotate. The body is rotated up to a speed above the resonant speed for dynamic balancing, which speed was previously determined during the setting up of the resonant cradle with the drivers connected so that their impulses are out of phase by 180 degrees and the pick-up assemblies connected so that their induced voltages are out of phase by 180 degrees or subtractive.

After the body is above dynamic resonant speed, the belt is disengaged and the body allowed to decrease in speed. After the body is above resonant speed the button R is turned to either "Hi" or "Lo" in the same manner as in making the static balancing operations so that the two pick-up assemblies will be connected into the electronic circuit. Since the pick-up assemblies are connected so that their induced voltages are 180 degrees out of phase, the amplitude meter will be recording a high amplitude which will be the sum of the amplitudes of the two induced voltages (modified by the damping dash pots) being picked up. As the speed of the rotating body begins to drop, the check mark on the body is viewed under the flashing of the Strobotron tube and this check mark will appear to be stationary. The pick-up assemblies will be picking up the vibrations being caused only by dynamic unbalance which, as already mentioned, will be produced by a net couple about an axis which is at right angles to the axis of the rotation of the body. When the body passes through resonant speed the position of the check mark on the body is noted and also the magnitude of the amplitudes being measured by the amplitude meter 129. After this is done the body is stopped and the body then turned to place the position of the check mark at the same clock position as it appeared under the stroboscope at the time the body was passing through resonant speed. After noting the amplitude reading two weights are selected of equal magnitude and they are temporarily placed on the rotating body. Since the dynamic unbalance is caused by a net couple, the weights must be placed on the body 180 degrees apart. One weight will be placed at the top or 12 o'clock postion and the other weight at the bottom or 6 o'clock position with the weights in separate axially spaced planes. The weight which is at the bottom should be on the same side of the body that corresponds to the pick-up assembly which has been reversed by the moving of the button S to reverse one of the pick-up assemblies so that the pick-up assemblies are out of phase by 180 degrees. In the particular switching arrangement shown this would be on the side of the No. 1 pick-up assembly 54. The other weight, of course, will be on the opposite side of the body. The magnitude of the weights which are placed on the body will be determined by the amplitude meter reading, the higher the amplitude reading the greater the size of the weights. To check whether the weights are proper to eliminate dynamic unbalance, the balancing operation will be repeated, that is, the body will be rotated up to above dynamic resonant speed and then allowed to slow down through resonant speed. As the body rotates through resonant speed the check mark will again be viewed under the stroboscope and if the amplitude meter registers zero or substantially zero it will be known that the dynamic unbalance has been eliminated. If the weights which have been added are too light, then there will be a reading on the amplitude meter 129 with the check mark remaining in the same position. If the weights should be too heavy, then the check mark will move 180 degrees. If there is still a dynamic unbalance, the weights will be changed as suggested by the reading of the amplitude meter and the position of the check mark and a recheck run again made. In making corrective measures for the dynamic unbalance, the previously corrected static unbalance will not be affected since with corrected dynamic unbalance two weights are used which are placed 180 degrees apart, that is, on diametrically opposed sides of the axis of the body. When both static and dynamic balance is obtained the balancing operations are completed. Other like bodies can be balanced on the cradle as already set up. When a different shape and size of body is to be balanced, the cradle must again be set up, but this is done in a short time by an experienced operator. When like bodies are being balanced they will always be placed on the shaft at the same point.

It will be particularly noted that our improved balancing apparatus permits the static and dynamic balancing of a rotatable body in a very simple, quick and efficient manner. The resonant cradle can be set up very quickly by making proper adjustment of the fulcrums of the springs. Furthermore, the cradle can be quickly adjusted to take care of different lengths of shafts by which the body is rotated. If the body does not have a shaft, a shaft will be provided, but if it is already provided with a rotating shaft as is, for example, the rotor of an electric motor, the brackets of the cradle can be quickly adjusted toward and away from each other to accommodate the shaft length.

In performing balancing operations at resonant speeds, any extraneous vibrations which may occur will not be sufficient to operate the stroboscope as such extraneous vibrations occur at different frequencies and are of much smaller magnitude than those causing static and dynamic unbalance. Furthermore, by balancing at resonance, the vibrations being set up by any static or dynamic unbalance will be independent of the mass of the body as has already been set forth. Consequently the machine is adapted for use on any size of body which can be mounted on any particular size of machine and of course this will include a large range of sizes, due to the adjustments provided. The resonant cradle can be set up very quickly and because of this no great time will be lost in setting up the cradle for balancing operations for different sizes and shapes of bodies. The simple manner in which the resonant cradle is set up is not possible with any other type of balancing machine on the market or known to applicants. The entire balancing apparatus can be constructed at a low cost in comparison with other balancing machines and yet its simplicity of operation and ease of setting up the yieldable cradle permits balancing to be accomplished in a minimum time.

Other methods of setting up the resonant type of cradle can be employed besides that embodied in the electronic hook-up shown in the wiring diagram of Figure 9. In Figure 14, for example, there is shown a schematic view similar to Figure 13 in which there is disclosed another method for setting up the resonant cradle by using the driver and pick-up assemblies of the previously described balancing machine. All of such structures are indicated by the same reference numerals as is also the body to be balanced, the shaft and the cradle springs. The two drivers 55 and 65 are excited by the same signal which can come from an independent source such as a suitable oscillator as indicated in the schematic view. Conductors connect the drivers to the oscillator and there is provided a reversing switch MRX whereby the drivers can be connected to give the same impulses in the same direction to the two leaf springs of the cradle, or can be connected to give to the springs impulses 180 degrees out of phase. The two pick-up assemblies 54 and 64 are connected into any device for comparing phase relationship as, for example, a cathode ray oscilloscope.

In setting up the cradle the driver assemblies are connected so that they are in phase. The body X to be balanced, together with the shaft, is mounted on the cradle. After the driver assemblies are excited the frequency of the oscillator is first adjusted to the resonant frequency of one of the springs and then the other spring is adjusted by its fulcrum so that the device for comparing phase relationship, that is, the cathode ray oscilloscope, shows zero phase relationship. The cradle is now set up for determining static unbalance and by a frequency meter the static resonant speed can be determined so that it is possible to rotate the body at this resonant speed in performing the balancing operations. To determine the dynamic resonant speed, the induced voltages of the pick-up assemblies are connected to be 180 degrees out of phase and the drivers are connected by throwing the reversing switch MRX so that they are driving in opposite directions, that is, their excitation is 180 degrees out of phase. The reading of the frequency meter will then give the resonant speed for dynamic unbalance. The actual balancing operations can be carried out in the same manner as already described and by similar structure, including the amplitude measuring circuit and meter.

Another method by which the system of Figure 14 can be employed to set up the cradle prior to performing the balancing operations is to place the body and shaft on the springs and then tune the oscillator until the amplitude meter registers maximum amplitude. One or both springs are then adjusted by the fulcrum or fulcrums so that the oscilloscope shows zero phase relationship. The cradle is then properly set up so as to have sustained oscillation at resonant frequency of the system and the actual balancing operations can be carried out in the manner already described. When the amplitude meter shows maximum reading, it is known that the independently excited driver assemblies are in tune with the natural frequency of the cradle and body, for otherwise they would be opposing, to at least a certain extent.

Although the body X to be balanced is shown as mounted on a shaft which has its ends resting on the bearing at the ends of the springs in the particular cradle shown, it is obvious that other arrangements can be made to accomplish balancing operations.

In the claims the term "corresponding zero values" is employed in connection with the vibratory supports disclosed in the described machine as leaf springs. When this term is used it means that the supports have such vibration that each will be passing through the midpoint between the extremes of vibration at the same instant. The vibratory supports may be vibrating in phase or 180 degrees out of phase.

Being aware of the possibility of modification in the particular methods and apparatus herein disclosed without departing from the fundamental principles of our invention, we do not intend that the scope of the invention be limited in any manner except as set forth by the appended claims.

What is claimed is:

1. The method of setting up a resonant cradle preparatory to performing balancing operations which cradle is provided with spaced apart vibratory supports upon which is placed the rotatable body to be balanced, said method comprising imparting to the supports with the body thereon in a non-rotating condition like impulses acting in phase and in such direction with such a frequency as to cause the cradle to have sustained oscillation at a resonant frequency of the system, and then so shifting the vibratory phases of the supports relatively to each other that said supports will vibrate in phase.

2. The method of setting up a resonant cradle having spaced apart vibratory supports upon which is placed a rotatable body to be balanced, said method comprising oscillating the supports with like impulses occurring simultaneously and in such a direction as to cause the supports and the body to have sustained oscillation at a resonant frequency of the system, and then relatively adjusting the vibratory phases of the vibratory elements of the supports so that the supports will vibrate in a phase relationship of zero or 180 degrees depending on the direction of the impulses and the obtained resonant frequency of oscillation.

3. The method of setting up a resonant cradle having spaced vibratory supports on which is placed a rotatable body to be balanced, said method comprising imparting to the supports with the body thereon in a non-rotating condition like impulses acting in phase and in opposite directions and at a frequency to be in resonance with the natural frequency of oscillation of the system and then adjusting the vibratory phases of the supports relatively to each other so that both supports will vibrate in a phase relationship of 180 degrees.

4. In a method of setting up a resonant cradle having spaced vibratory supports for a rotatable body to thereby permit the performing of static balancing operations on the body, said method comprising the steps of imparting to the supports with the body thereon in a non-rotating condition like impulses acting in phase and in the same direction to thereby cause said supports and body to vibrate, sensing the vibrations of the system at the supports, then controlling the imparted impulses by the vibrations so sensed that said imparted impulses will cause said cradle with the body thereon to have a sustained oscillation at the static resonant frequency of the system, and then adjusting the vibratory phases of the supports relative to each other so that the vibrations of the supports are in phase.

5. The method of setting up a resonant cradle having spaced apart resilient supports capable of vibration and upon which is placed a rotatable body to be balanced, said method comprising oscillating the supports by imparting thereto like impulses acting in phase in opposite directions and with a frequency to be in tune with the dynamic resonant frequency of vibration of the system, and then relatively adjusting the resilient elements of the supports with the body mounted thereon to thereby relatively change their phases of vibrations so that the vibrations of the elements are 180 degrees out of phase.

6. The method of setting up a resonant cradle having spaced apart vibratory supports upon which is placed a rotatable body to be balanced, said method comprising imparting to the supports, with the body thereon in a non-rotating condition, electrically created like impulses acting in phase and the directions of the impulses being in the same plane passing through the axis of the body, adjusting the frequency of the impulses to be in resonance with the natural frequency of vibrations of the system, and then comparing the phase relationship of the vibrations of the two supports and making any necessary relative adjustment of the vibratory phases of the supports so that the phase relationship of the vibrations of the supports is such that the vibrations have corresponding zero values.

7. In a method for statically balancing a rotatable body, which comprises providing a vibratory cradle having spaced vibratory supports, setting up said cradle with the body thereon by imparting thereto such impulses as to cause the cradle to have sustained oscillation about the natural center of oscillation of the body and at the static resonant frequency of the system, adjusting the vibratory supports to have similar vibratory characteristics, noting the static resonant frequency of the system, rotating the body on the cradle at a speed to cause the cradle to vibrate at a frequency corresponding to the resonant frequency of the system, determining the angular plane in which the static unbalancing force is acting when the body is so rotating, and then placing on the body at a point diametrically opposite the unbalancing force a weight sufficient to counter-balance the unbalancing force.

8. The method of determining the dynamic unbalance of a rotatable body which comprises mounting the body for rotation on spaced vibratory supports, establishing sustained oscillation of both supports by imparting such impulses thereto that the supports and body oscillate at the dynamic resonant frequency of the body and said supports when the body is not rotating, so directing the imparted impulses and adjusting the vibratory phases of the supports that the supports vibrate 180 degrees out of phase, rotating the body on the supports, operating a stroboscopic lamp once each cycle of rotation of the body by an electrical impulse established as a result of the vibration due to the action of the dynamic unbalancing couple, then determining by a check point on the rotating body the radial plane in which the unbalancing couple is acting when said point is observed under the stroboscopic lamp and the body is rotating at dynamic resonant speed.

9. In a method of determining the static and dynamic unbalance of a rotatable body, the steps of providing a cradle having spaced vibratory supports, positioning the body on the supports, causing said cradle and body to be set up to have sustained oscillation at resonant frequency of the system by imparting to the vibratory supports impulses acting in phase with the same frequencies and necessary magnitudes to obtain said oscillation, adjusting the vibratory supports to have similar vibratory characteristics, noting the static and dynamic resonant frequency of the system, rotating the body on the set up cradle, separating the vibrations caused by the static unbalancing force from the vibrations caused by the dynamic unbalancing couple when the body is rotating, and then determining the radial planes in which the static unbalancing force and the dynamic unbalancing couple are acting when the body is rotating at its static and dynamic resonant speeds.

10. The method of setting up a vibratory cradle preparatory to performing balancing operations on a rotatable body wherein the cradle comprises spaced vibratory members independently vibratable, said method comprising placing a body in a non-rotating condition in contact with the members so as to form with the cradle a vibratory system, simultaneously imparting like impulses in axially separated parallel planes generally perpendicular to the axis of rotation to the system including the body, controlling the phase relationship of the vibrations produced by the said separated imparted impulses by varying the relationship of the resonant frequency of the said system with respect to the frequency of the imparted impulses, said system with its spaced vibratory members being capable of determining its own center of oscillation when said separated impulses are imparted thereto, and then controlling the imparted impulses as to direction and frequency so that the cradle with the body thereon in a non-rotating condition will have such sustained oscillation that it will correspond in character to the oscillation produced by the unbalanced condition of the body when the body is rotating on the cradle at a given speed, said controlled imparted impulses in relation to an equivalent unbalance force being known to the operator at the time sustained oscillation takes place.

11. A method of setting up a vibratory cradle preparatory to performing balancing operations which cradle is provided with spaced resilient supports, said method comprising placing the body to be balanced in a non-rotating condition on the resilient supports, simultaneously imparting controlled like impulses in axially separated parallel planes generally perpendicular to the axis of rotation to the body to cause the system to vibrate around its natural center of oscillation, controlling the phase relationship of the vibrations produced by the said separated imparted impulses by varying the relationship of the resonant frequency of the said system with respect to the frequency of the imparted impulses, sensing the vibrations of the system, and then further controlling the separated imparted impulses by the vibrations so sensed that the cradle and body thereon will have a sustained oscillation at a resonant frequency of the system, thus enabling by the controlled imparted forces and by the desired conditions of vibrations the determination of the amount and location of unbalance when the body is rotated.

12. In a balancing apparatus, a frame support structure, two horizontally arranged parallel leaf springs, means for rigidly mounting like ends of the springs on the frame support structure, bearing means on the opposite ends of the springs for supporting a rotatable body at axially spaced points, a fulcrum for the underside only of each spring positioned intermediate its ends, means for adjusting at will the position of each fulcrum with respect to the ends of the spring with which it is associated to give infinite vibratory phases and an electrically operated driver and a pickup connected to the outer end of each spring.

13. In balancing apparatus, a cradle comprising spaced vibratory supports arranged to support a rotatable body, vibratory means acting on each of the supports for causing same with the body thereon in a non-rotating condition to vibrate and the cradle to have sustained oscillation about the natural center of oscillation of the body and at a resonant frequency of the system, means responsive to the vibration of the supports for sensing the vibrations imparted to the supports, means connected with both the sensing means and the vibratory means for controlling the impulses produced by said vibratory means by the vibrations so sensed, and means acting on the supports for so adjusting the vibratory supports that said supports vibrate in phase and at the frequency to cause the sutained oscillation to be at a resonant frequency of the system to thereby set up the cradle preparatory to any balancing operations.

14. In a balancing apparatus, a frame structure, a vibratory cradle on the frame structure including two resilient supports, means on the supports for supporting a rotatable body at axially spaced points, means for adjusting the supports to give infinite vibratory phases, an electrically operated driver and an electrical pickup connected to each resilient support, and electrical circuit means connected with the drivers and pickups for causing the frequency of vibrations of the system as picked up by the pickups to so control the frequency of vibrations of the drivers that the supports with the body thereon can have sustained oscillation at a resonant frequency of the system.

15. In a balancing apparatus, a frame structure, two horizontally arranged parallel leaf springs, means for rigidly mounting like ends of the springs on the frame structure, bearing means on the opposite ends of the springs for supporting a rotatable body at axially spaced points, a fulcrum for the under side only of each spring positioned intermediate its ends, means for adjusting at will the position of each fulcrum with respect to the ends of the spring with which it is associated to give infinite vibratory phases, an electrically operated driver and an electrical pickup connected to the outer end of each spring, and electrical circuit means connected with the drivers and pickups for causing the frequency of vibrations of the system as picked up by the pickups to so control the frequency of vibrations of the drivers that the springs with body thereon can have sustained oscillation at a resonant frequency of the system.

16. In a balancing apparatus, a vibratory cradle and means for setting up said cradle preparatory to performing balancing operations, including spaced vibratory members for supporting a rotatable body, means acting on the members for adjusting the vibratory phases thereof, electrically operated driver means connected to each vibratory member, electrical circuits for causing the driver means to operate and transfer like impulses acting in phase to the members, electrical pickup means connected to each vibratory member to receive impulses, circuits for electrically connecting the pickup means into the circuits of the drivers, means in said circuits for causing the impulses being picked up to so control the impulses of the driver means being transmitted to the vibratory members that said members with a body supported on both members in a non-rotating condition can have sustained oscillation at a resonant frequency of the system.

MARCELLUS S. MERRILL.
LOWELL H. ERICKSON.

References Cited in the file of this patent

UNITED STATES PATENTS

| Number | Name | Date |
|---|---|---|
| Re. 19,812 | Moyer et al. | Jan. 7, 1936 |
| 1,553,936 | Feeney | Sept. 15, 1925 |
| 1,553,941 | Kasley | Sept. 15, 1925 |
| 1,554,754 | Osgood et al. | Sept. 22, 1925 |
| 1,600,569 | Sperry | Sept. 21, 1926 |

| Number | Name | Date |
|---|---|---|
| 1,637,361 | Trumpler | Aug. 2, 1927 |
| 1,639,444 | Terry | Aug. 16, 1927 |
| 1,689,672 | Kasley | Oct. 30, 1928 |
| 1,731,880 | Trumpler | Oct. 15, 1929 |
| 2,090,803 | Moore | Aug. 24, 1937 |
| 2,092,096 | Swedlund | Sept. 7, 1937 |
| 2,165,024 | Baker et al. | July 4, 1939 |
| 2,301,291 | Kolesnik | Nov. 10, 1942 |
| 2,363,373 | Werner | Nov. 21, 1944 |
| 2,382,843 | Annis | Aug. 14, 1945 |
| 2,383,405 | Merrill et al. | Aug. 21, 1945 |
| 2,405,474 | Van Degrift | Aug. 6, 1946 |
| 2,486,896 | Weaver et al. | Nov. 1, 1949 |
| 2,487,035 | Weaver et al. | Nov. 1, 1949 |
| 2,500,013 | Svensson et al. | Mar. 7, 1950 |

FOREIGN PATENTS

| Number | Country | Date |
|---|---|---|
| 282,681 | Germany | Mar. 15, 1915 |
| 624,857 | Germany | Jan. 30, 1936 |
| 664,552 | Germany | Aug. 29, 1938 |

OTHER REFERENCES

A textbook entitled Vibration Problems in Engineering by S. Timoshenko, 1st edition. Published by Van Nostrand Co., Inc., 250 Fourth Ave., New York, N. Y., October 1928. See pages 19 and 38–47.